United States Patent [19]

Paraskevakos

[11] 3,842,208

[45] Oct. 15, 1974

[54] SENSOR MONITORING DEVICE

[75] Inventor: Theodoros G. Paraskevakos, Athens, Greece

[73] Assignee: Paraskevakos Electronics & Communication, Inc., Wilmington, Del.

[22] Filed: July 11, 1972

[21] Appl. No.: 270,637

Related U.S. Application Data

[63] Continuation-in-part of Ser. No. 260,511, June 7, 1972, which is a continuation of Ser. No. 76,436, Sept. 29, 1970, and a continuation-in-part of Ser. No. 125,705, March 18, 1971.

[30] Foreign Application Priority Data

Apr. 25, 1972 Greece .................................. 45068

[52] U.S. Cl. .................................. 179/5 R, 179/2 A
[51] Int. Cl. .......................................... H04m 11/04
[58] Field of Search ..................... 179/2 A, 5 R, 5 P

[56] References Cited

UNITED STATES PATENTS

| | | | |
|---|---|---|---|
| 3,492,426 | 1/1970 | Foreman | 179/5 R |
| 3,581,216 | 5/1971 | Stevenson | 179/5 R |
| 3,588,362 | 6/1971 | Kass | 179/5 R |
| 3,595,999 | 7/1971 | Cole | 179/5 P |
| 3,702,902 | 11/1972 | Willis | 179/5 R |

*Primary Examiner*—Ralph D. Blakeslee
*Attorney, Agent, or Firm*—Cushman, Darby & Cushman

[57] ABSTRACT

A sensor monitoring device for connection to a telephone line which device automatically generates electrical pulses for accessing a predetermined remote telephone receiver in response to the triggering of a connected sensor, e.g., an alarm or metering device. Thereafter, further identifying data pulses are automatically generated and transmitted to the remote receiver. In the preferred embodiment the same pulse generating apparatus is used for both types of line pulsing by driving it with a low frequency clock to produce the simulated dialing pulses and with a higher frequency clock to produce the identifying data pulses. The identifying data preferably includes both a location code and a type-of-alarm code or metering quantity code. Further, in the preferred embodiment, the identifying data is multiply transmitted to insure reception at the remote receiver. Special precautions are also prescribed in insure initial telephone line seizure by the monitoring device after it is activated. Preferably, the remote receiving equipment includes a special answer-back circuit to signal the transmitter that the desired connection has been achieved and if this code is not received, the transmitter effectively re-dials the desired remote location.

16 Claims, 16 Drawing Figures

SENSOR MONITORING DEVICE

This is a continuation-in-part of my earlier copending application Ser. No. 260,511 filed June 7, 1972 which is a Rule 60 continuation of application Ser. No. 76,436, filed Sept. 29, 1970, and also a continuation-in-part of my earlier copending application Ser. No. 125,705, filed Mar. 18, 1971.

This invention relates generally to sensor monitoring devices. More specifically, this invention relates to a device which automatically monitors a plurality of sensors such as alarm devices and which is triggered into action as soon as any one of the sensors is actuated. When the device is thus activated, it automatically seizes a telephone line connected thereto and pulses (or otherwise stimulates) that telephone line to automatically connect the monitoring device with a remote receiving unit through the usual telephone switching exchanges. Thereafter, the connected telephone line is utilized to transmit further identifying digital data to the remote receiver which data identifies both the location of the transmitting alarm monitor and the type of alarm or metering device which has been actuated thereat.

Heretofore, when these kind of automatic alarm monitoring and signaling devices have been attempted, the result has been a complicated and costly structure of electromechanical devices, magnetic tape drive devices and/or costly special purpose electronic circuits.

Now, however, it has been discovered that with this invention the desired results may be achieved utilizing only standard integrated circuit electronic components with many of these components connected such that they are commonly utilized for both the automatic dialing of the remote telephone receiver and the later transmission of further identifying data thereto.

Normally, the alarm monitoring device of this invention will be connected at a single store site or home or factory, etc. The usual telephone line will be connected to its output terminals while a plurality of different types of alarms and/or metering devices may be connected to several different corresponding input terminals. Of course, if desired, alarms of only one type might also be connected to the input terminals as will be appreciated from the detailed discussion to follow.

In the usual installation, burglar alarms might be connected to one set of input terminals while fire alarms might be connected to another set of input terminals. Further specific types of alarms and/or meters might be connected to other sets of input terminals. For instance, a cardiac alarm might be connected to one further set of terminals such that when actuated it signals a probable heart attack at the installation site and thus the need for an ambulance equipped with cardiac care equipment. Of course, further different types of medical emergencies could be likewise connected to respectively corresponding sets of input terminals. In short, any desired type of alarm might be associated with a particular corresponding set of input terminals.

In metering installations, the local meter would be adapted to trigger a corresponding "alarm" whenever a predetermined quantity of gas, electricity, etc., had been consumed. Of course, the remote receiver in this case would probably comprise a computer programmed to accumulate such metering signals in a billing account associated with that particular customer. Of course, the metering device could also be adapted to monitor vending machines (signalling when empty, when being tampered with, etc.) and other applications as should be apparent. In general, the term "sensor" as used herein refers to any alarm, meter, etc., which changes its state as a function of some predetermined occurrence.

While most of the alarms are automatically actuated and/or include manual switches for actuation, any of the desired alarms might also be remotely actuated with a hand-held unit if desired. For instance, in the case of the cardiac alarm, a heart patient might carry such a remote control radio signaling device with him at all times such that this type of alarm could be remotely triggered by merely pressing his remote control button thus eliminating the need to physically transport himself to the site of the telephone or other central location where the usual cardiac alarm manual switch might be physically located.

In the preferred embodiment of this invention, most of the apparatus for generating and transmitting data over the telephone line is normally unenergized to thus conserve energy and at the same time increase the expected life of the electronic components associated with these functions. Of course, the first input circuits are continuously activated so as to continuously monitor the condition of the various alarms connected thereto. Then, upon the triggering of any one of those alarms, the whole unit is activated including a power supply for the remainder of the electronic components in the data generating and transmission section of the device.

It is to be expected in many situations that some extension telephone or the like will be occupying the telephone line when one of the alarms is triggered. Anticipating such an unfortunate occurrence that might occur, for instance, when a heart patient in an upstairs bedroom experiences a heart seizure while his grandson downstairs continues to chat with his friend on the telephone line a special line seizure technique has been incorporated in this invention to insure that the alarm monitoring device seizes control of the telephone line in spite of some pre-existing telephone usage that might be occurring. For this reason, as soon as the unit is activated there is a first sequence of events which occurs to insure that the telephone line has in fact been seized by the alarm monitoring device. This involves an initial signal to close a telephone receiving relay and to open the dialing contacts followed by a delayed line opening signal and then closing again. Of course, this procedure of guaranteed line seizure also thwarts a would-be criminal who might telephone his victim's number and then leave the calling telephone off the hook in an attempt to tie up the telephone lines while he enters and escapes with his loot as will be more apparent from the following detailed description.

After the telephone line has been seized, the monitoring device enters an initial or first time period during which a remote telephone receiver is accessed automatically. In the case of dial telephone systems, the telephone line would be pulsed as appropriate to simulate the dialing of the telephone number corresponding to the remote telephone receiver. In the case of touch tone or other systems, obvious modifications in the exemplary embodiment such as those discussed below would result in similar simulations of telephone line stimulations designed to automatically access the remote telephone receiver.

After automatically accessing the remote telephone receiver site, the alarm monitoring device of this invention enters a subsequent or second time period during which further identifying data is transmitted to the remote receiving site. In the preferred embodiment, the identifying data comprises a first data portion which includes the telephone number of the subscribing line to which the monitoring device is directly attached as well as a further second data portion which identifies the type of alarm device that has been activated. Of course, other types of identifying codes could also be employed to identify both location of the sending alarm monitor as well as the type of alarm that has been triggered.

Accordingly an operator at the remote receiving unit is at once signaled of both the location of the alarm monitor and the type of alarm that has been tripped. Appropriate action can then be taken by the operator to insure that the proper type of response vehicle is promptly dispatched to the indicated alarm monitoring site. That is, police could be dispatched if a burglar alarm has been tripped, firemen could be dispatched if a fire alarm has been tripped, and ambulance (properly equipped for the particular medical emergency indicated) could be dispatched if a health emergency alarm has been tripped, etc.

Typically, the signal sent out over the telephone line during the first period must occur at a much slower rate than the further identifying data signal sent out during the second or subsequent time period of operation. For instance, simulated dial pulses must occur at approximately 10 cycles per second to properly activate the automatic switching equipment located at the telephone exchanges. On the other hand, it is preferred that the further identifying data be transmitted at a much higher rate, preferably somewhere in the audio band of frequencies.

The preferred embodiment of this invention, which is described in more detail below, achieves both these objectives while yet using a great deal of common electrical devices for both the first and the second or subsequent time periods of data generation and transmission. In the preferred embodiment, this is achieved by driving the transmission equipment with a higher frequency oscillator during the second period of operation.

Furthermore, the data generating and transmission portion of this device is further simplified by incorporating therein concepts from my earlier co-pending application Ser. No. 76,436, filed Sept. 29, 1970, wherein one pulse number generator is utilized for generating all possible combinations of data digit values. The particular desired sequence of transmitted data values is programmed by connecting particular predetermined outputs from this pulse number generator with particular predetermined inputs of output gating circuits (which in this case comprise a conventional IC multiplexing switch) for predetermined sequential data transfers to circuits which then drive a line pulsing relay or other means to pulse the telephone line and thus effectively transmit the dial pulses and the further identifying data pulses over the telephone line.

The telephone receiver located at the remote telephone site is preferably constructed as disclosed in my further co-pending U.S. application Ser. No. 125,705, filed Mar. 18, 1971. While it is theoretically possible for such a receiver to accurately receive and register the further identifying data on a single transmission thereof, it is preferable that the further correct data has in fact been received and displayed. Thus, the preferred embodiment of this invention includes special counting circuitry for insuring that the further identifying data is multiply transmitted some predetermined number of times. In the preferred embodiment, the data is transmitted some 14 times during the second period of operation which should be more than sufficient to insure that at least two of the data transmissions are accurately received at the receiving site so that the receiving circuitry is properly activated to register the further identifying data at the remote receiving site.

Since it is possible that the remote telephone receiver is busy, etc., when first dialed, the preferred embodiment of this invention includes special command circuitry for detecting a special "answer-back" code from the remote receiver once it is successfully accessed. If the special answer-back code is not received, the transmitter effectively "hangs up" the transmitting telephone and then restarts a complete dialing process designed to access the desired remote receiver.

Further objects and advantages of his invention will become apparent from the following detailed description taken together with the accompanying drawings, of which;

Figure 11:
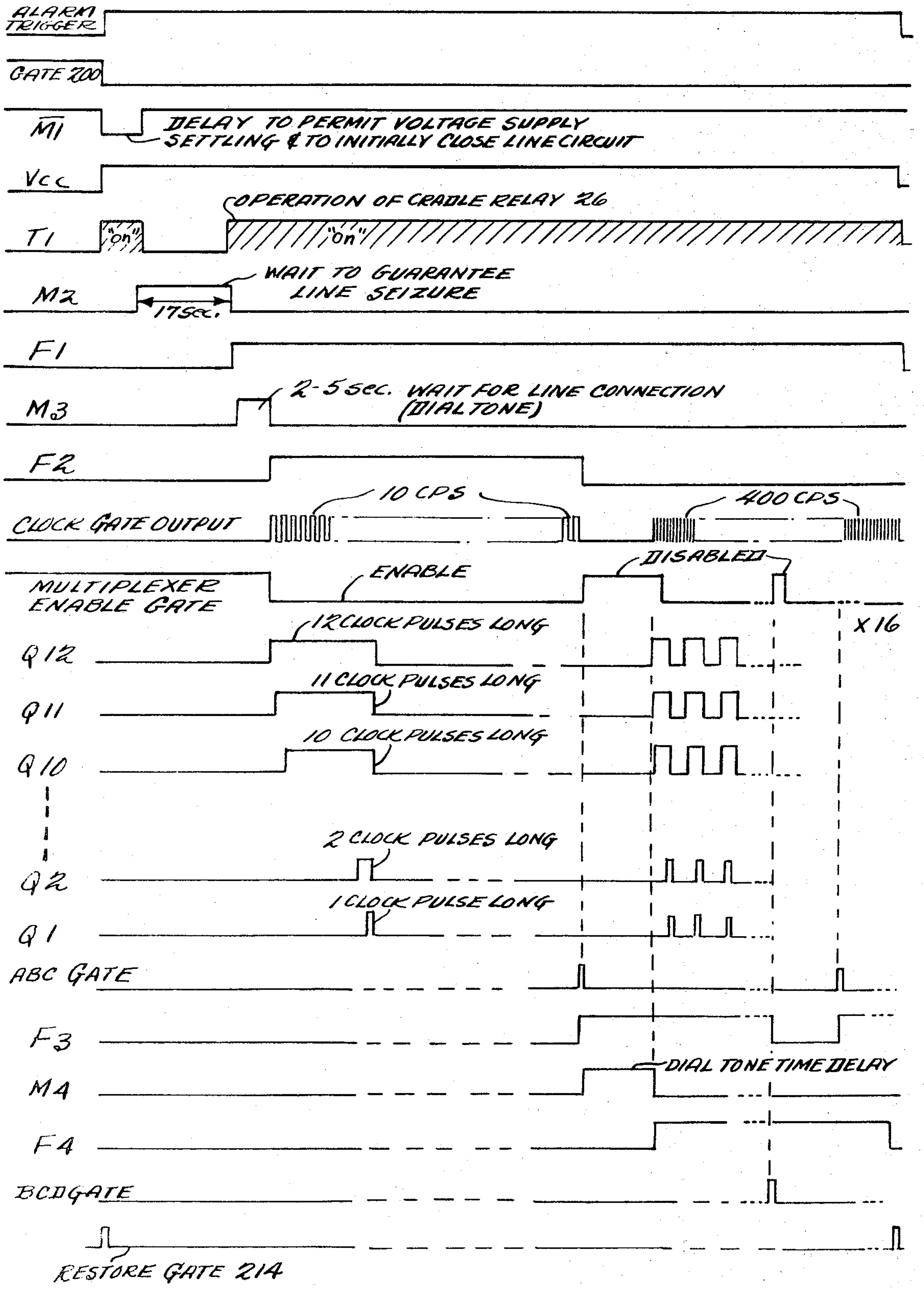
Figure 12:
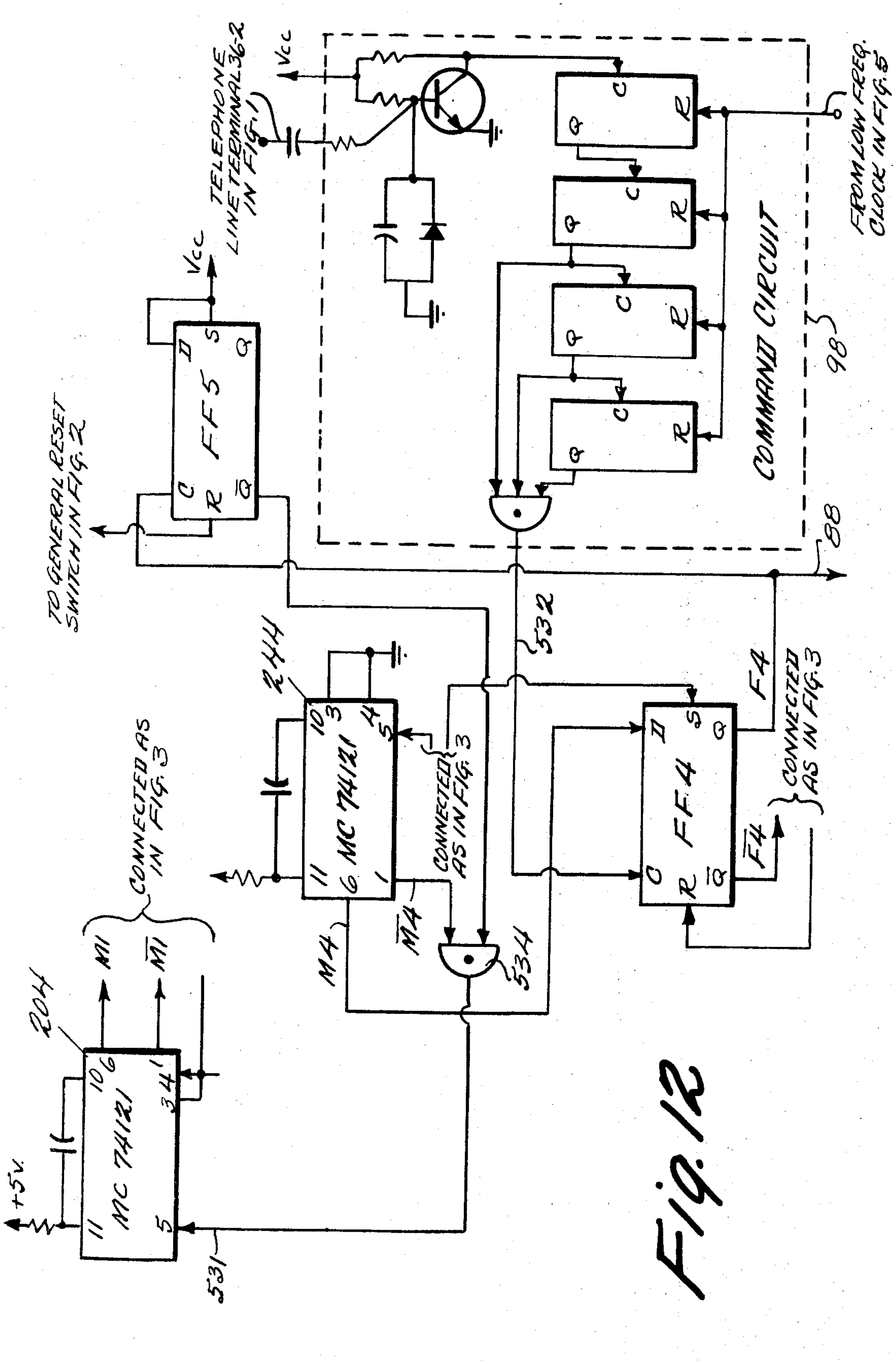
Figure 13:
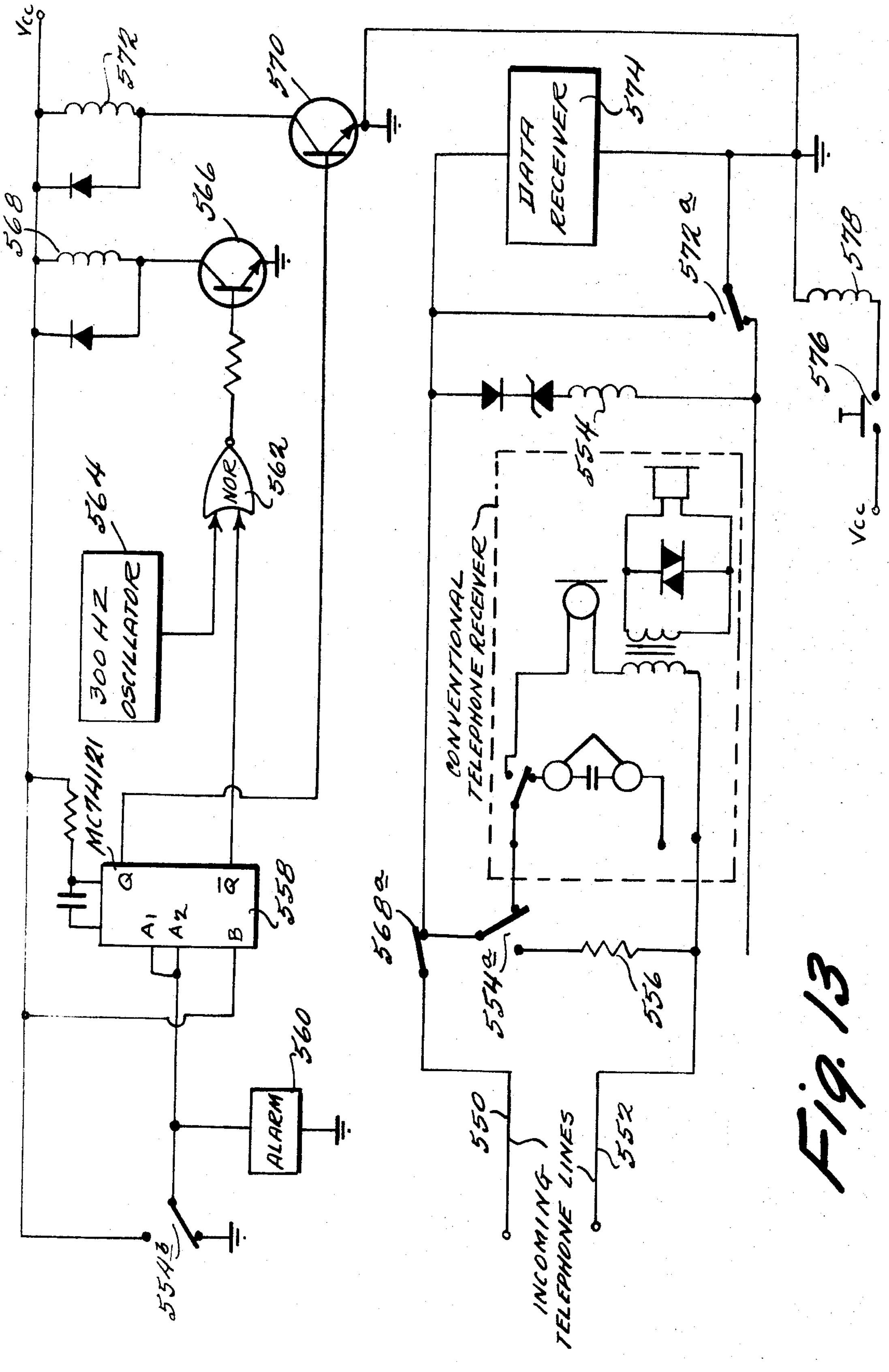
Figure 14:
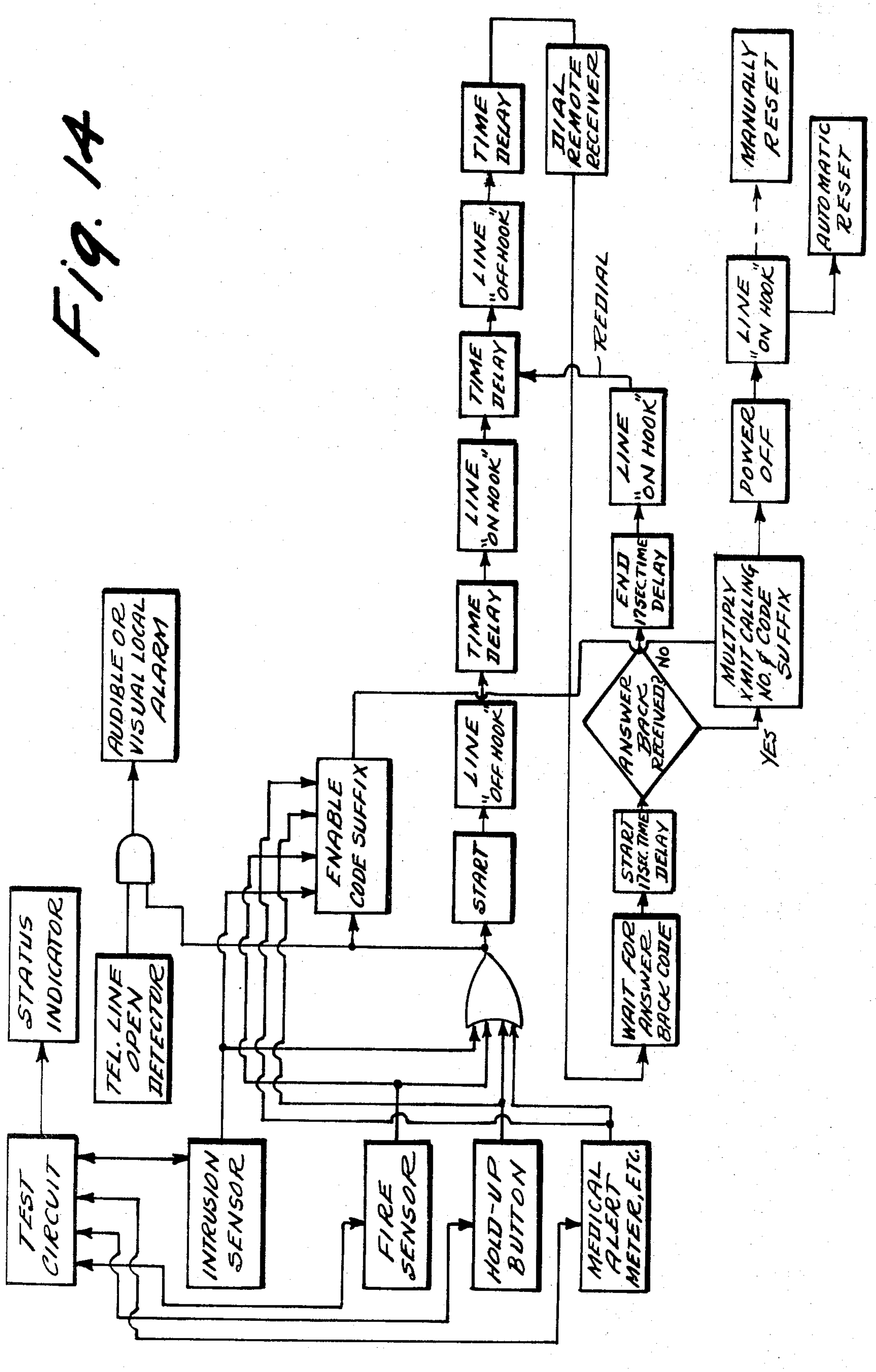
Figure 15:
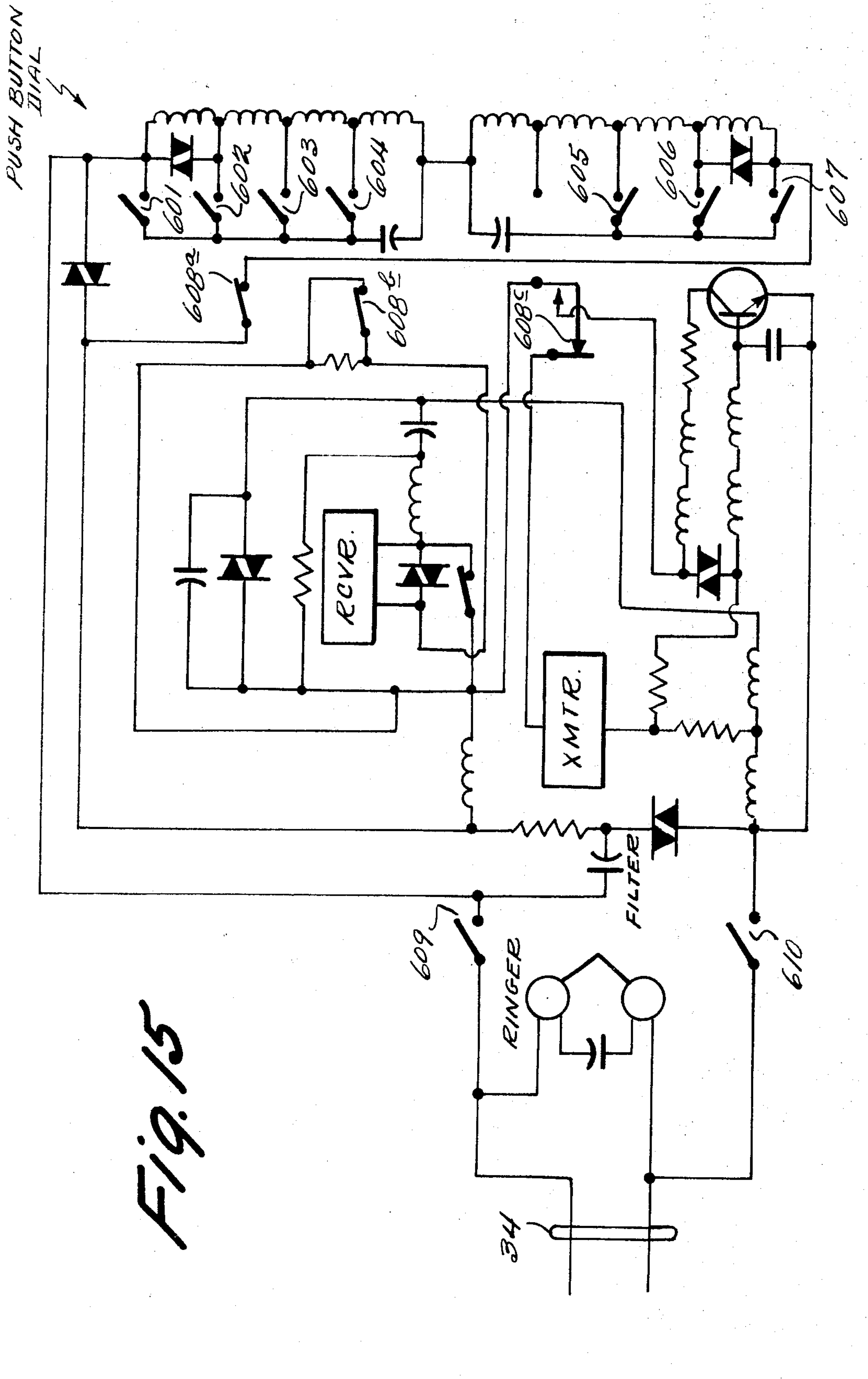
Figure 16:
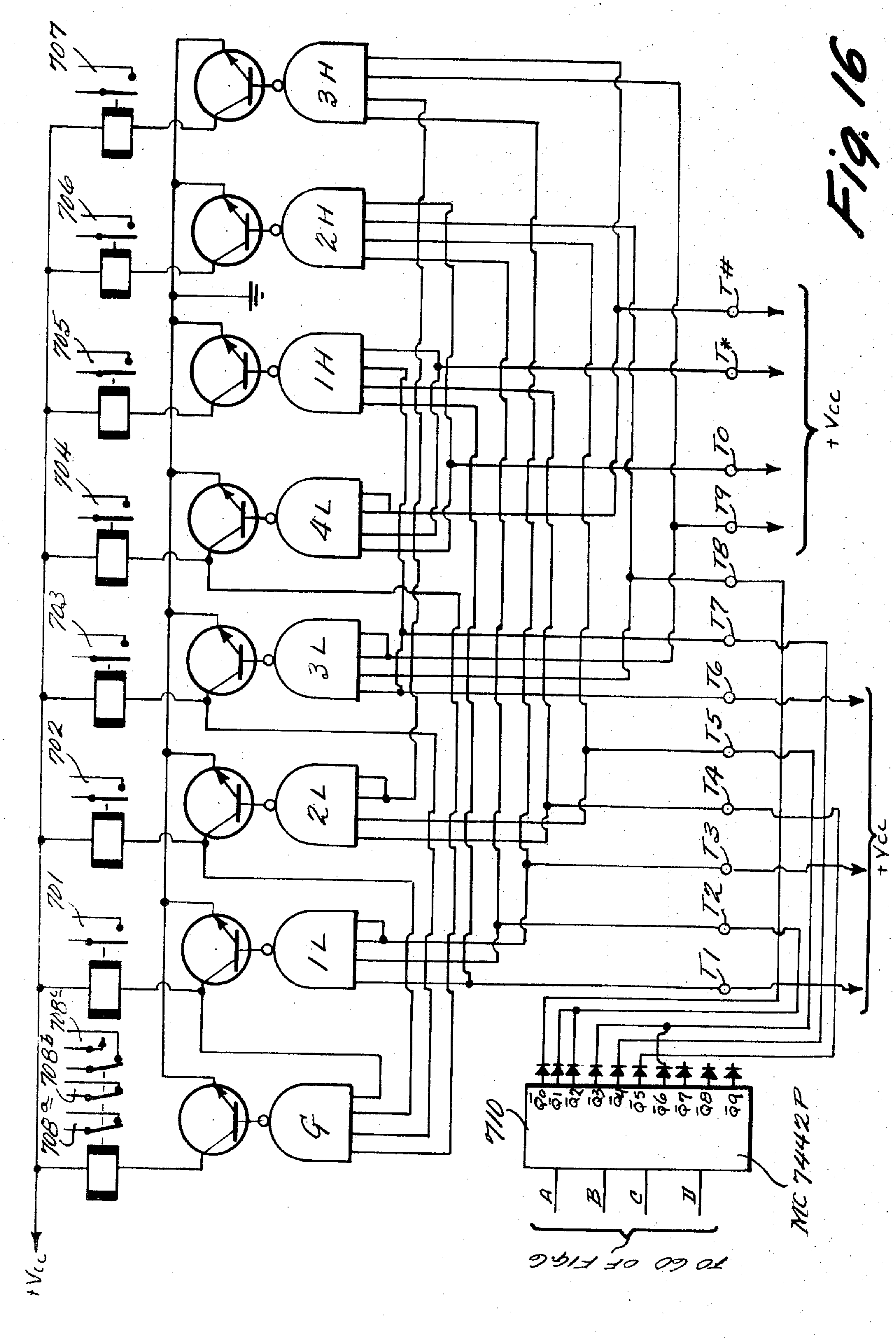

FIG. 11 graphically depicts several different waveforms which occur at different points in the exemplary embodiment of this invention and which waveforms are helpful in understanding the sequence of operations which occur in the exemplary embodiment of this invention;

FIG. 12 is a detailed schematic of an exemplary command circuit (shown generally in FIG. 1) and of the accompanying modifications to the remaining circuitry for proper use therewith;

FIG. 13 is a schematic diagram of an exemplary remote receiver for use with the command circuit shown in FIG. 12;

FIG. 14 is a general flow diagram of the preferred exemplary embodiment of the invention incorporating the command circuit feature;

FIG. 15 is a circuit diagram of a typical conventional touch tone telephone device; and FIG. 16 is a schematic diagram of one possible modification of the previous exemplary embodiment to permit touch tone operations.

The exemplary embodiment of this invention may be constructed from standard commercially available integrated circuits as will be appreciated by those in the art from the following description. Many of the IC circuits depicted in the drawings have been identified with manufacturers component numbers as will be recognized by those in the art.

Figure 1:
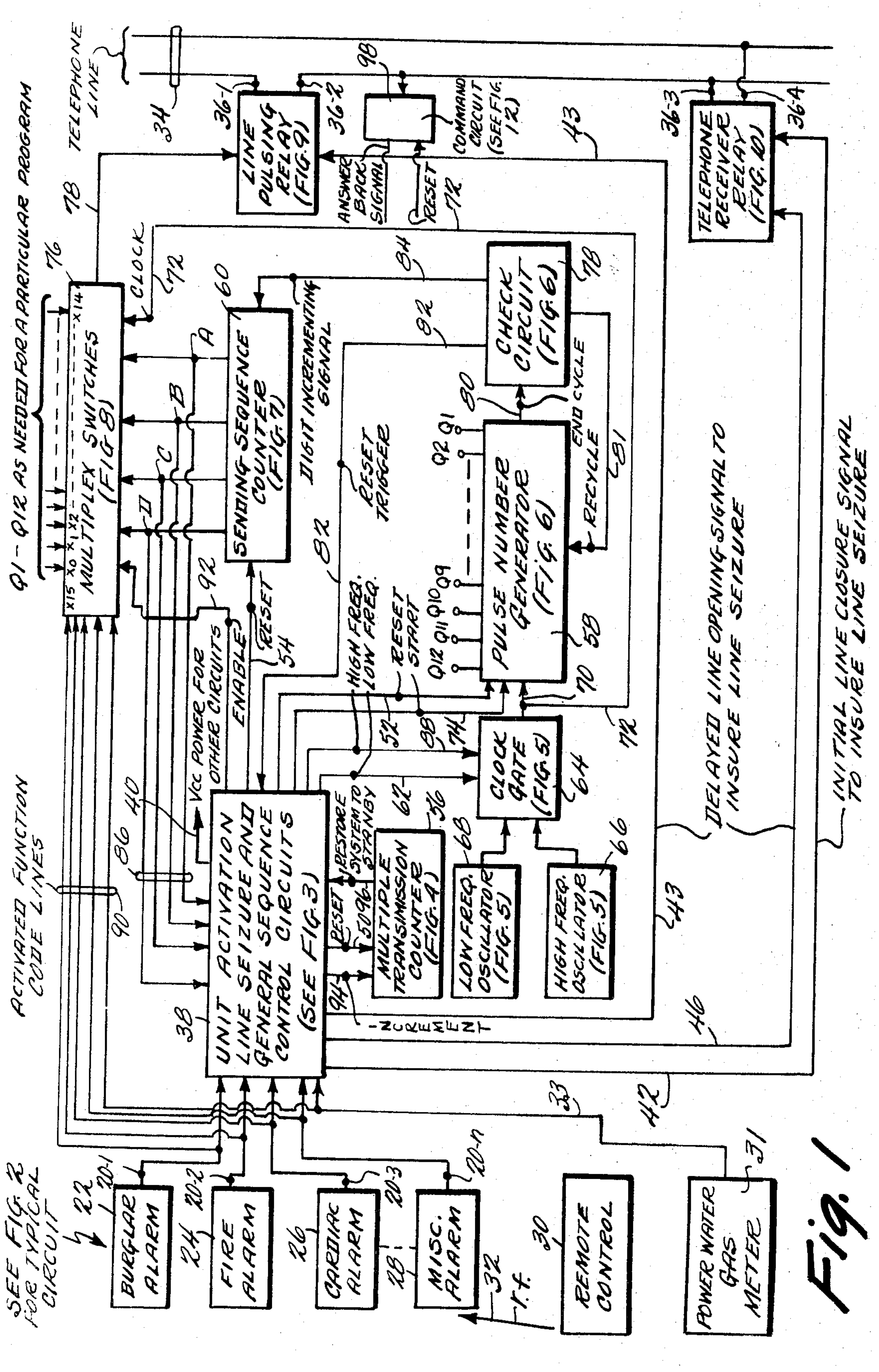
FIG. 1 is an overall block diagram of a preferred embodiment of the alarm monitoring device of this invention.

As shown in FIG. 1, various types of alarm circuits are connected to input terminals 20-1, 20-2, 20-3 . . . **20-*n*. For instance, burglar alarm circuits 22, fire alarm circuits 24, cardiac alarms 26 and/or other types of miscellaneous alarms 28** may be connected to respectively corresponding input terminals as shown. When triggered, these alarms generate signals which are then transmitted through their respective input terminals to the alarm monitoring device of this invention as shown to the right-hand side of the input terminals in FIG. 1.

Several types of remote control radio transmitting and receiving apparatus are well known in the art. Accordingly, a suitable conventional remote control transmitter 30 may be associated with corresponding remote control receivers in any one of the alarm circuits 22 through 28 such that the corresponding alarm may be triggered through the remote control unit 30 via radio frequency or other types of propagating transmission media 32 as will be appreciated by those in the art.

Metering devices 31 may also be connected over corresponding input lines 33 to trigger the transmitter whenever a predetermined quantity of power, water, gas, etc., has been consumed thus constructing the automatic input to a billing system located at a central site.

On the right-hand side of FIG. 1 the standard telephone lines 34 are depicted. The telephone line 34 is connected to the alarm monitoring device through output terminals 36-1, 36-2, 36-3 and 36-4 as shown in FIG. 1. As will be appreciated, terminals 36-2 and 36-3 could easily be combined into a single terminal since they are electrically connected in common in the preferred exemplary embodiment shown in FIG. 1. The output terminals 36-1 and 36-2 are utilized for pulsing the telephone line to simulate dial pulses and/or to transmit further identifying digital data. Output terminals 36-3 and 36-4 are utilized to control access to the telephone line by simulating circuit closures corresponding to those which normally occur when the hand-held telephone ear and mouth piece is removed from (on-hook) and placed into (off-hook) the cradle position thus actuating certain well-known switch closures in the telephone receiver circuitry.

The unit activation, line seizure and general sequence control circuits 38 operate to coordinate the operating sequence of the alarm monitoring device of this invention. In the usual stand-by mode, only a very few initial circuits in unit 38 are supplied with power. However, as soon as any one of the alarm or metering devices is triggered, this causes activation of an appropriate power supply circuit to supply power $V_{cc}$ on line 40 for the other circuits within box 38 as well as the rest of the circuits shown in FIG. 1. Accordingly, during the stand-by mode of operation, a minimum amount of electric power is being consumed and, furthermore, the circuits normally in the inoperative or non-powered state should have a longer than usual useful life since they are not in a continuously energized state.

Concurrently with the sensing of an alarm or metering trigger and the supply of power $V_{cc}$ for the remainder of the circuits, an initial line closure signal is sent out over line 42 to the telephone receiving relay circuits 44 to simulate a momentary answering of the telephone. That is, to simulate the pickup or removal of the hand-held ear and mouth piece unit from the standard telephone receiver. Accordingly, even if a would-be thief has previously dialed the telephone number of the victim's residence and then left the telephone off the hook, this initial line closure signal will cause a relay closure at 44 to simulate a momentary answering of the telephone ring at the residence of the proposed victim.

Subsequently, a delayed line opening signal is produced on line 46 which causes the telephone receiver relay circuit 44 to simulate the replacement of the usual hand-held mouth and ear piece unit to the cradle of the telephone receiver. This delayed line opening signal proceeds for several seconds (e.g., 17 seconds) thus giving the usual telephone switching circuitry back at the central exchange sufficient time to sense the situation and to restore the telephone line 34 to its non-busy condition. At the same time, a similar delayed opening signal is sent over line 43 to the line pulsing relay circuits 48 to insure opening of the telephone line even though someone else may already be using another extension telephone on the same line.

Subsequent to the 17 second delay, the telephone receiver relay circuits 44 again cause a circuit closure to simulate the removal of the hand-held ear and mouth piece of the usual telephone receiver such as if one were preparing to place a telephone call. A further time delay of approximately 2 to 5 seconds is provided at this point to insure proper line connections at the central exchange of the telephone equipment. That is, in the usual case, a dial tone will appear within 2 to 5 seconds after one lifts the telephone receiver from the cradle.

After this just recited sequence of events to insure line seizure, the general sequence control circuits in unit 38 take over and initiate a first time period during which the line pulsing relay circuits 48 are caused to simulate the dialing of a predetermined telephone number corresponding to the telephone number of the remote receiver to which communication is desired. At the beginning of this period, reset signals are generated and transmitted on lines 50, 52 and 54 to reset the counters and/or flip-flop circuits involved in the multiple transmission counter 56, the pulse number generator 58 and the sending sequence counter 60 as will be explained in more detail below.

Furthermore, a signal is produced on line 62 to cause the clock gate 64 to block the higher frequency output of oscillator 66 and to pass the low frequency (e.g. 10 cycles per second) output of oscillator 68 through to the output 70 to serve as clock pulses for driving the pulse number generator 58 and also on line 72 for mixing with the final output signals as will be described in more detail below.

The pulse number generator 58 then receives a start signal on line 74. The pulse number generator 58 as well as the sending sequence counter 60 and the multiplex switches 76 and the check circuits 79 may all be replaced with equivalent pulse number generator and gating equipment as disclosed in my earlier co-pending application Ser. No. 76,436. In general, the function of the pulse number generator 58 is to generate signals representing all of the possible data values for any given digit with predetermined outputs therefrom being connected to predetermined inputs of the multiplex switches 76 such that a predetermined sequence of desired data values is finally output on line 78 for driving the line pulse relay circuits 48. In particular, the output signals on line 78 comprise a series of pulse trains with each pulse train representing the data value for one particular digit. The number of pulses in the train is directly representative of the number value of the digit in the preferred embodiment. As those in the art will appreciate, different code structures could just as well be utilized and/or alphanumeric data values could also be utilized by simply making provisions for additional numbers of pulses for each pulse train. In general, the signals on line 78 comprise serial digital representations of successive data values.

In the preferred embodiment, the first seven digits of data to be transmitted along line 78 are for the purpose of simulating the usual dialing pulses to access a predetermined remote telephone receiving site. Of course, if long distance codes are to be included as well, then at least 10 digits would be included within this first time period, as will be appreciated.

As previously discussed, the low frequency oscillator 68 is effectively connected to provide the clock pulses on line 70 and 72 for driving the transmission generating and transmitting portion of the device. Accordingly, during this first time period the output on line 78 will also occur at this low frequency (e.g. 10 Hz.).

As shown in the exemplary embodiment of FIG. 1, the pulse number generator 58 provides 12 outputs which are successively labeled Q1, Q2, Q3 ... Q12. As will be explained in more detail below, the pulse output for one cycle of operation on terminal Q12 has a duration which corresponds to 12 clock pulse periods while the output on terminal Q11 has a duration which corresponds to 11 clock pulse periods, etc., on through Q1 which has a time duration corresponding to 1 clock pulse period. Of course, since the pulse number generator 58 is actually driven by the source of clock pulses on line 70, the outputs on Q1 through Q12 will occur synchronously with the clock pulses input thereto.

Accordingly, for any one cycle of operation, a pulse output will first begin appearing on terminal Q12 and 1 clock pulse period later another output will begin on Q11 followed by another output beginning on Q10 1 clock pulse subsequent to that, etc., etc., until 11 clock pulse periods later an output finally begins to appear on Q1.

At the end of one such cycle of operation, an end-cycle signal appears on line 80 to drive the check circuitry 79. In response to this end-cycle signal, a reset trigger signal on line 82 is fed back to the general sequence control circuits 38 whereupon a reset signal is generated on line 52 for resetting the pulse number generator 58 thus resetting all of the outputs Q1 through Q12 back to their original quiescent state.

Furthermore, in response to the end-cycle signal on line 80, the check circuit 79 produces a digit incrementing signal on line 84 which increments a four stage binary sending sequence counter 60. As will be appreciated, the sending sequence counter accumulates such digit incrementing signals from line 84 such that its instantaneous contents always represent the number of complete pulse number generator cycles that have been completed during any given operation of the device.

In effect, the sending sequence counter 60 is utilized as a "pointer" for the set of multiplex switches 76 to determine which one of the 16 inputs $X_0$, $X_1$...$X_{15}$ is to be connected with the common output line 78. That is, assume for a moment that the sending sequence counter 60 has just been reset by a signal on line 54 to a contents of 0000. In this case, the multiplex switches 76 are conditioned to cause the input terminal $X_0$ to be connected with the output terminal 78 (as will be explained in more detail below, the clock pulse signals on line 72 are actually mixed with the common output appearing on line 78). Then, as soon as a digit incrementing signal appears on line 84, the sending sequence counter is incremented to a contents of 0001 whereupon the multiplex switch unit 76 is conditioned to cause the next successive input (i.e. $X_1$) to be effectively connected to the common output 78. As those in the art will appreciate, since the sending sequence counter 60 is a four stage binary counter, there are 16 possible states thereof which correspond to 16 possible different conditionings of the multiplex switches 76 to cause respective ones of the 16 different inputs to be successively connected to the output 78 in dependence upon the instantaneous condition of the sending sequence counter 60. Of course, if more than 16 digits are to be transmitted, then the sending sequence counter 60 must also have a maximum contents greater than 16 and the multiplex switches 76 must have a greater maximum capacity as well.

The four interstage binary outputs of the sending sequence counter 60 are connected over lines 86 to the sequence control circuits 38 such that predetermined points in the sending sequence may be sensed whereupon the sequence control circuits may produce further control signals. For instance, when the sequence control 38 senses that the first seven digits in the sequence have already been transmitted (corresponding to the low frequency line pulsing or dial simulation during the first period of operation), the gating signal on line 62 is terminated and another gating signal on line 88 is produced thus causing the clock gate 64 to produce high frequency pulses from the high frequency oscillator 66 at its output 70 and also on line 72 as previously discussed.

Accordingly, after the first seven digits have been transmitted, the clock pulse frequency is effectively increased to cause the same number generating and transmitting equipment to operate at a higher frequency for sending out the further identifying data. During this second or subsequent time period the pulse number generator 58, check circuit 79, sending sequence counter 60 and multiplex switches 76 continue to operate to send out successive pulse trains along line 78 as previously discussed although at a much higher frequency. The first one of these pulse trains is usually a special control digit which is transmitted to the receiving site to indicate the beginning of a transmission sequence for the data which is to follow. Thereafter, the next seven digits correspond, in this exemplary embodiment, to the telephone number of the telephone line 34, i.e., the telephone subscriber for which the automated alarm monitoring device of this invention is performing its function. Of course, other data codes for identifying the subscribing lines 34 could be used instead of the telephone number if desired.

As explained so far, the first seven digits of the transmission sequence are in a first time period at a low frequency to simulate dial impulses on the telephone line 34. Thereafter, a second time period begins for the transmission of nine further digits. The first digit is a special control digit signifying the beginning of a data transmission period while the next seven digits correspond to the telephone number for the telephone line 34. The final digit in the sequence (the 16th digit overall) corresponds to a special code identifying the type of alarm or meter which has been tripped. The activated alarm will cause a signal to pass over a corresponding one of the code lines 90 into the multiplex switches 76 which, as will be described in more detail below, causes a particular predetermined code to be transmitted from terminal $X_{15}$ to the common output 78 whenever the sending sequence counter 60 is in its 16th state (corresponding to the state 1111).

The general sequence control circuits 38 also produce appropriate enabling signals along line 92 to the multiplex switches 76. As will be appreciated by those in the art, the enable signal on line 92 is present only when the multiplex switches 76 are to be operated. That is, the enable signal on line 92 first appears during the first time period when the simulated dialing process is underway. During the transition from the first to the second time period the enable signal on line 92 disappears while it re-appears again for the duration of the second time period during which the actual identifying data is generated and transmitted over telephone lines 34.

At the conclusion of the first sequence of operation, (i.e., the transmission of all 16 data digits input to the multiplex switch 76) an incrementing signal is generated on line 94 to increment the multiple transmission counter 56. Thereafter, another complete sending sequence is begun. However, during the second (and subsequent) sending sequences, the clock gate 64 continues to gate the high frequency clock pulses to the pulse number generator and, in addition, the multiplex switches 76 are *disabled* during the first seven states of the sending sequence counter 60 such that the multiplex switches 76 are actually enabled only for transmitting the last nine input data digits ($X_7$ through $X_{15}$).

Accordingly, during the second sending sequence only the additional identifying data corresponding to these last nine digits is actually transmitted over the telephone line 34. At the end of this second sequence of operation, an increment signal on line 94 is again generated to increment the multiple transmission counter 56. Thereafter, a third sending sequence similar to the second sending sequence ensues, and this process continues to repeat itself until the multiple transmission counter 56 is incremented to some predetermined contents whereupon a restore signal is generated on line 96 to cause the general sequence control circuits 38 to revert back to a standby basis as in the beginning whereat only the initial alarm and meter monitoring stages are supplied with energizing power thus terminating the data generating and transmitting sequences of the device. Furthermore, the signal on line 46 will then disappear causing the telephone receiver relay 44 to simulate the replacement of the usual telephone hand piece within its cradle thus freeing the telephone line 34 for a further communication process similar to the overall process just described should another alarm or meter be triggered thereafter.

In the preferred embodiment, the remote receiver answers back with a special signal which is detected by command circuit 98. In this embodiment of the invention, the remote site is automatically redialed unless the proper answer back code is detected. That is, the identifying and alarm or metering data is transmitted only after the proper remote receiver has been successfully accessed as evidenced by the presence of the answer back code. The necessary modifications to the sequence control circuits 38 will be discussed in detail below.

Figure 2:
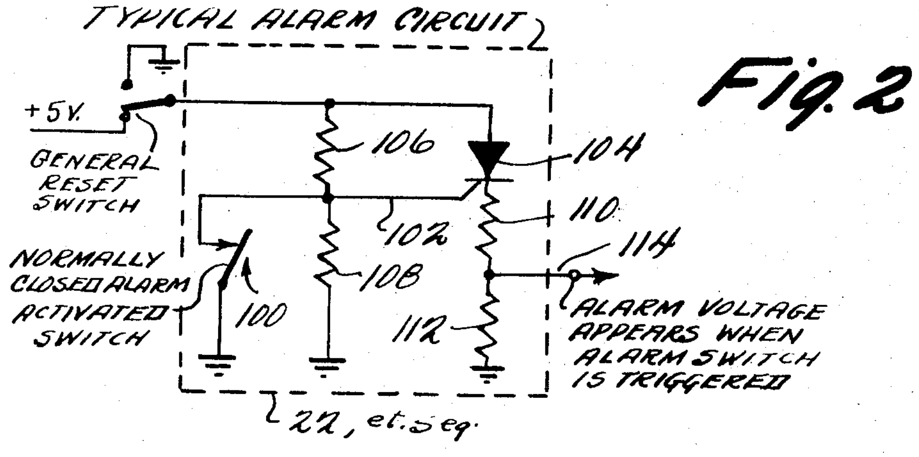
FIG. 2 is a detailed circuit diagram of a typical alarm circuit that might be utilized in conjunction with this invention.

A typical alarm or meter circuit is shown in detail in FIG. 2. Here a normally closed alarm or meter switch 100 normally grounds the control electrode 102 of an SCR 104. However, when the alarm or meter is triggered, the normally closed switch 100 opens thus causing a positive voltage from the 5-volt supply to appear through the voltage divider comprising resistors 106 and 108 on the control electrode 102 thus triggering the SCR 104 and causing current to pass through a further resistive voltage divider comprising resistors 110 and 112. As will be appreciated, this will result in an output step of alarm or meter indicating voltage appearing on line 114. The voltage will continue to appear on line 114, of course, until the 5-volt supply has been removed via the general reset switch 115 or its equivalent to re-arm the alarm circuit as will be appreciated by those in the art. It will also be appreciated that other types of alarm or metr circuits might be utilized.

Figure 3:
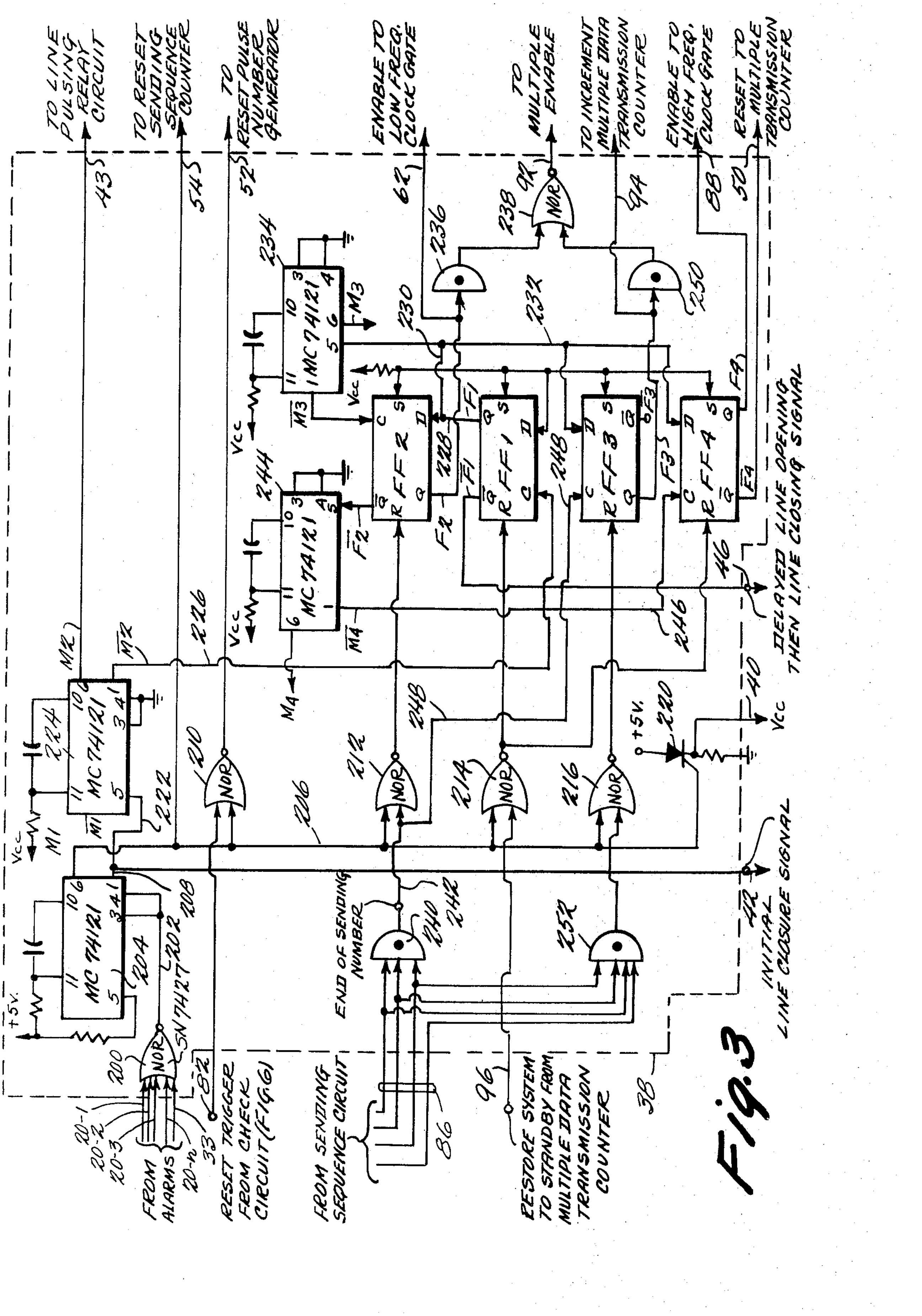
FIG. 3 is a detailed circuit diagram of an exemplary unit activation, line seizure and general sequence control circuits utilized in the exemplary embodiment of this invention and as disclosed generally in block form in FIG. 1.

An exemplary embodiment for the unit activation, line seizure and general sequence control circuits is shown in detail at FIG. 3. Here, the input terminals **20-1, 20-2, 20-3 ...20-*n* and 33 are shown as separate corresponding inputs to a NOR logic circuit 200. The NOR circuit 200 is normally energized to provide a high (sometimes referred to as a 1) logic level signal on line 202. However, whenever any one of the inputs to the NOR circuit 200 itself goes high, the output on line 202** will make a transition to the opposite or low logic level state, thus effectively grounding anything connected to the output.

The output of the NOR circuit 200 is connected to trigger a monostable multivibrator 204 thus causing the logic level at output M1 to transition from a low to a high level while at the same time the complement of M1 ($\overline{M1}$) appears on line 208 as a transition from a normally high logic level to the opposite or low logic level as will be apparent to those in the art. Of course, the RC time constant associated with the monostable multivibrator 204 will determine the exact duration of the time period during which this transition will continue to occur. After this time period, which may correspond 2 to 5 seconds, the M1 and $\overline{M1}$ signals will revert to their original states, namely, M1 will be low while $\overline{M1}$ will be high.

As shown in FIG. 3, the initial line closure signal line 42 is connected to the output $\overline{M1}$ on line 208. The short duration transition from high to low and back to high signal level on line 208 is inverted within the telephone receiver relay circuitry 44 (as seen in detail in FIG. 10) to cause a relay to actuate during this brief time interval and connect the usual telephone receiver into circuit across the telephone line 34 thus simulating a short answering period.

The short duration M1 signal on line 206 is bussed to several NOR gates 210, 212, 214 and 216 to produce several corresponding reset signals as will be discussed below. It is further input to trigger an SCR 220 thus providing voltage $V_{cc}$ on line 40 for other circuitry in the device as previously discussed. Of course, the voltage $V_{cc}$ is also used to supply the remainder of the circuitry shown in FIG. 3 with supply voltage as indicated therein.

First of all, the M1 signal on bus line 206 is utilized directly on line 54 to reset the sending sequence counter 60. Furthermore, it is input to NOR gate 210 to produce a reset signal on line 52 for resetting the pulse number generator 58. It is also input to NOR gate 212 to cause a resetting of flip-flop FF2 as shown in FIG. 3. Additionally, it is input to NOR gate 214 to cause a resetting of flip-flop FF1 and FF4 as is also shown in FIG. 3. Finally, it is input to NOR gate 216 to cause a resetting of flip-flop FF3 as also is indicated in FIG. 3. Accordingly, it may be seen that the output of the monostable vibrator 204 is utilized to produce an initial line closure signal on line 42 as well as reset signals on lines 54, 52 and for resetting flip-flops FF1, FF2, FF3 and FF4.

Throughout the following detailed discussion, reference should be made periodically to FIG. 11 for understanding the operating sequence of the various signals present in this device. For instance, as shown in FIG. 11 a step function is generated at some point in time on one of the inputs to the NOR gate 200 when one of the corresponding alarms is triggered. Thereafter the output of gate 200 goes low as shown in FIG. 11 and at the same time outputs M1 and $\overline{M1}$ (only $\overline{M1}$ is shown in FIG. 11) are produced to cause the initial line closure signal and reset signals previously discussed. Furthermore, the voltage supply $V_{cc}$ is activated with the first transition of monostable 204.

Figures 9, 10:
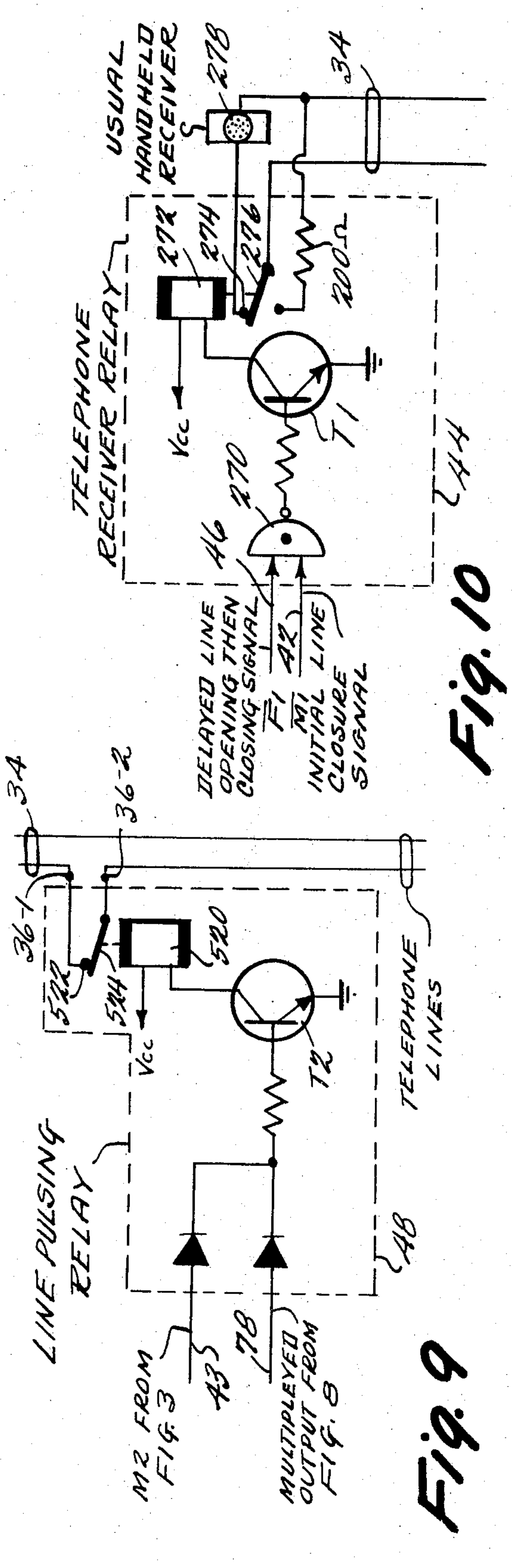
FIG. 9 is a detailed circuit diagram of exemplary line pulsing relay circuits which are also shown generally in block form at FIG. 1.
FIG. 10 is a detailed circuit diagram of exemplary telephone receiver relay circuits which are also shown generally in block form at FIG. 1.

Referring now to FIG. 10, the telephone receiving relay circuits 44 are shown. The output of monstable multivibrator 204 $\overline{M1}$ is input as one input to the NAND gate 270. Accordingly, the NAND gate 270 inverts $\overline{M1}$ and causes transistor T1 to conduct for the duration of $\overline{M1}$ as shown on the fifth line of FIG. 11. Of course, as may be appreciated from FIG. 10, when T1 is "on" the relay 272 is actuated to close contacts 274 and 276 thus connecting the conventional handheld receiver 278 across the telephone lines 34.

Referring back to FIG. 3, $\overline{M1}$ is also connected along line 222 to trigger a further monostable multivibrator 224. The time period of monostable 224 is approximately 17 seconds since it is usual to experience an approximately 15 second maximum time delay after hanging up the telephone before all of the central exchange switching equipment of the telephone company is completely disconnected from the telephone line. Accordingly, the function of the monostable 224 is to provide such a time delay. The output M2 is connected directly along line 43 to the line pulsing relay circuit 48 to insure that the telephone line is opened at this point in the circuit during this 17 second time delay.

The output $\overline{M2}$ from monostable 224 is connected along line 226 to trigger flip-flop FF1 to its "set" state whereat the logic output F1 goes high and the logic output $\overline{F1}$ goes low. $\overline{F1}$ is connected to line 46 to provide the delayed line opening then closing signal. Actually it provides a signal for closing relay 272 (FIG. 10) at the end of the 17 second time delay produced by monostable 224 as should now be appreciated. The output F1 from flip-flop FF1 is connected along line 228 to enable flip-flop FF2 and along lines 230 and 232 to enable flip-flops FF3 and FF4 while at the same time triggering monostable 234 which provides a 2 to 5 second time duration output M3 and $\overline{M3}$ as shown in FIG. 3. M3 is not utilized while $\overline{M3}$ is utilized to clock flip-flop FF2 at the end of the 2 to 5 second time delay period. This time delay produced by monostable 234 is produced to cause a corresponding wait for a line connection (dial tone) from the central telephone exchange.

Referring to FIG. 11, the 17 second time delay output M2 is shown on line 6 of FIG. 11 while the output F1 is shown on line 7 and the corresponding time delay M3 on line 8. Line 9 shows the triggering of flip-flop FF2 to produce signal F2 (and also $\overline{F2}$. The output F2 of flip-flop FF2 is connected directly to line 62 as an enable input to the low frequency clock gate as shown in FIG. 3. Furthermore, it is gated through an AND gate 236 as one input to a NOR gate 238, the output of which is connected on line 92 as an enable signal for the multiplex switches 76. Accordingly, as soon as F2 comes on, a high input is presented to the NOR circuit 238 which thereupon produces a low logic signal on line 92 to serve as an enable signal for the multiplex switches 76. Accordingly, at this point in time everything is set up to begin operation during the first time period for sending out the first sequence of seven digits corresponding to a simulated dialing of the predetermined telephone number of the remote telephone receiver site.

This state of affairs will continue until AND gate 240 (connected over cable 90 to the sending sequence counter 60) senses the end of the first time period (i.e., the completion of sending the seventh digit in the transmission sequence) thus providing another input over line 242 to NOR gate 212 to reset flip-flop FF2. When flip-flop FF2 is reset $\overline{F2}$ goes high to trigger a monostable multivibrator 244 thus removing the enable signal on line 62 to the low frequency clock gate as well as that on line 92 to the multiplex switches 76. The time delay of monstable 244 is to permit the central telephone exchange equipment to complete the desired connection to the remote telephone site after the simulated dialing sequence during the first time period.

At the end of this time delay, the monostable 244 will automatically transition back to its quiescent state thus causing $\overline{M4}$ to go high. This $\overline{M4}$ signal is connected over line 246 to clock flip-flop FF4 causing F4 to go high and thus produce an enable signal to the high frequency clock gate on line 88 as shown in FIG. 3. At the same time, it must be remembered that AND gate 240 has sensed the end of the first period and produced his signal on line 242 which is also connected via line 248 to clock the flip-flop FF3 thus producing a high logic level on output F3 which is connected through AND gate 250 and NOR gate 238 to again produce a low logic level enabling signal on line 92 to the multiplex switches 76.

Accordingly, the device is now properly conditioned to begin transmission of the next succeeding nine digits of data at the higher frequency clock rate. This state of affairs will continue until the last digit has been transmitted whereupon AND gate 252 (also connected to sending sequence counter over cable 90) senses the end of the second period and produces through NOR gate 216, a reset signal for flip-flop FF3 thus causing the output F3 to go low and remove the enable signal on line 92 to the multiplex switch as well as to produce an incrementing signal on line 94 for incrementing the multiple data transmission counter 56.

Since the high frequency clock gate is still enabled via line 88 and logic signal F4, the pulse number generator will continue to cycle at the high frequency rate through the first seven digits of a next transmission sequence. However, since there is no enable signal on line 92 to the multiplex switches, no actual transmission will occur during this period. However, at the end of the first seven digit sequence, the gate 240 will again produce a signal on line 242 to cause resetting of flip-flop FF2 (which will cause no action, of course, since FF2 is already reset) and another setting or clocking of flip-flop FF3 along line 248 to again produce a high signal on F3 and thus enable the multiplex switches 76 for the last nine digit sequence of this second overall transmission sequence.

Accordingly, the last nine digit data sequence will continue to be repetitively transmitted until finally a restore signal is received over line 96 from the multiple data transmission counter 56 as a further input to NOR gate 214 whereupon flip-flop FF1 and flip-flop FF4 will be reset thus removing the enable signals from flip-flops FF2, FF3 and FF4 and terminating all further operations as should now be apparent. This restore signal on line 96 should also be used for extinguishing the SCR 220 and for re-arming the alarm circuits as will be apparent to those in the art.

Figures 4, 5:
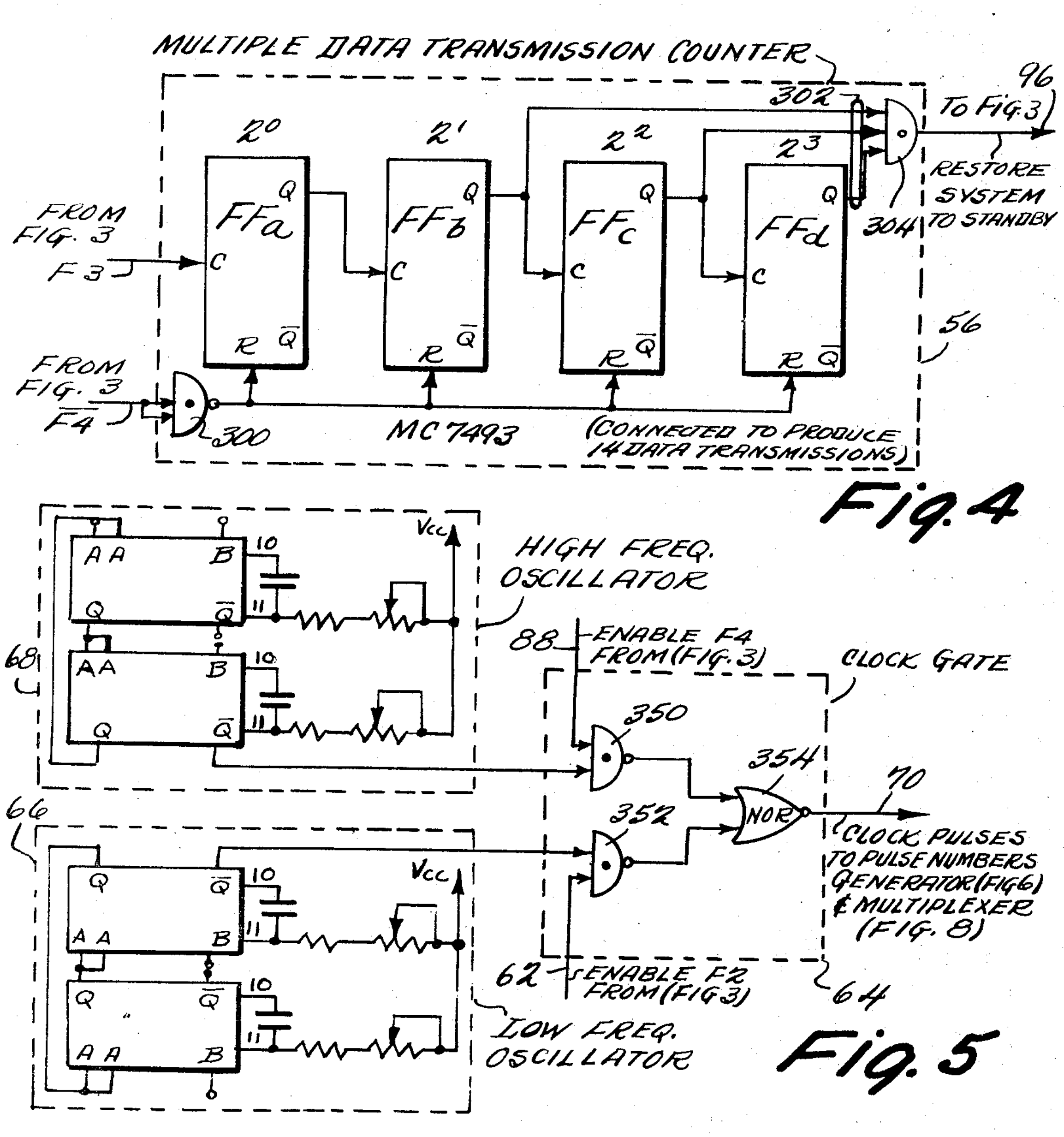
FIG. 4 is a detailed circuit diagram of an exemplary multiple data transmission counter which is also shown generally in block form in FIG. 1.
FIG. 5 is a detailed circuit diagram of exemplary low and high frequency oscillators together with clock gating circuitry which is also shown generally in block form in FIG. 1.

The multiple data transmission counter as shown in FIG. 4 comprises a conventional four stage binary flip-flop counter. The logic signal $\overline{F4}$ from FIG. 3 is input through an AND gate 300 to reset all the flip-flop stages $FF_a$, $FF_b$, $FF_c$ and $FF_d$ as shown in FIG. 4. On the other hand, once during each transmission cycle, logic signal F3 is transitioned to cause a clocking of flip-flop $FF_a$ as should now be apparent to those in the art. Flip-flop $FF_b$ is transitioned every other time flip-flop $FF_a$ is transitioned, etc., as should also be apparent to those in the art. Accordingly, the four flip-flop states correspond to the binary digit values shown in FIG. 4.

When the last three stage flip-flops are set, high logic level signals will appear on all of lines 302 thus triggering an output from AND gate 304 on line 96. As will be apparent to those in the art, in the exemplary embodiment shown in FIG. 4, this corresponds to a multiple data transmission counter contents of 14 thus meaning that the device will continue to repetitively cycle until 14 cycles have been accumulated whereupon a restore signal will appear on line 96 for input to gate 214 thus causing flip-flop FF1 to be reset to cause the entire system to be reset to its normal quiescent monitoring state.

The high and low frequency oscillator and clock gates are shown in FIG. 5. Both the oscillators are conventional oscillators. As shown in the exemplary embodiment of FIG. 5, both the high and low frequency oscillators comprise two monostable multivibrators connected back-to-back with a vernier frequency control for each of the monostable periods. Those in the art will realize that other equivalent oscillator forms are equally useful.

Typically, the low frequency oscillator will produce pulses at approximately 10 Hz. while the high frequency oscillator might produce pulses anywhere in the audio range or any other range capable of transmission over lines 34 but preferably between 100 and 4,000 Hz.

The high frequency oscillator output is connected as one input to an AND gate 350 while the low frequency output from oscillator 66 is connected as one input to an AND gate 352. AND gate 350 is enabled by logic output signal F4 on line 88 from flip-flop FF4 in FIG. 3 while AND gate 352 is enabled by logic signal F2 from flip-flop FF2 in FIG. 3 on line 62. The outputs of both AND gates 350 and 352 are input to NOR gate 354 which then provides an inverted output on line 70. Accordingly, as those in the art will now appreciate, the clock pulses appearing on line 70 occur at the low frequency rate when F2 is high while they appear at the high frequency rate when F4 is high.

Figure 6:
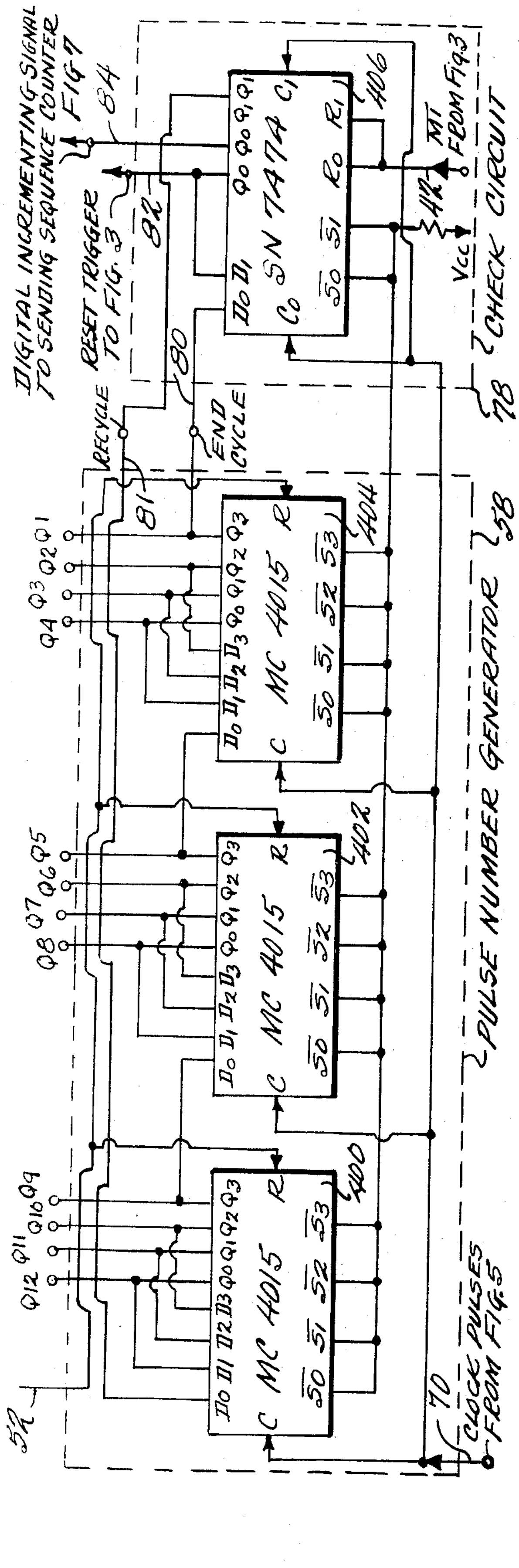
FIG. 6 is a detailed circuit diagram of an exemplary pulse number generator which is also shown generally in block form at FIG. 1.

The pulse number generator 58 is shown in detail at FIG. 6. Boxes 400, 402 and 404 represent conventional integrated circuit structures comprising four flip-flop multivibrators each. The flip-flops within each of the integrated circuit units are numbered from 0 through 3 with the D lettered inputs being enable inputs and the Q lettered outputs representing the set outputs of the respectively corresponding flip-flop stages. All of the flip-flops in each stage are reset and clocked simultaneously from a common input. Finally, the S lettered terminals of each block are connected to a supply voltage $V_{cc}$ as shown in FIG. 6. Together, the units 400, 402 and 404 constitute a set of 12 interlocked cascaded flip-flops which produce the outputs Q1 through Q12 as previously discussed and as depicted graphically in FIG. 11.

The check circuit 78 is also shown in FIG. 6 and it comprises a similar kind of integrated circuit 406 but wherein only two flip-flops $Q_0$ and $Q_1$ are utilized.

Initially, when logic signals $\overline{M1}$ on line 74 transitions from low to high, the check circuit flip-flops are both reset thus causing $\overline{Q}_1$ of integrated circuit 406 to go high thus producing a high signal on line 81 which is connected to terminal $D_0$ of integrated circuit 400 to enable the first flip-flop circuit therein to transition upon the occurrence of the next clock pulse connected thereto from line 70 all as shown in FIG. 6. Accordingly, when the next clock pulse occurs, flip-flop $Q_0$ in circuit 400 will transition to cause Q12 to go high. At the same time, Q12 is connected to enable the next flip-flop at terminal $D_1$ such that upon the occurrence of the second clock pulse flip-flop $Q_1$ will transition in circuit 400 thus causing Q11 to go high. Similarly, Q11 is connected to enable the next succeeding flip-flop, etc., etc., down through Q1. When Q1 transitions on the 12th clock pulse, the first flip-flop in circuit 406 is enabled over line 80 with an end-cycle signal. Accordingly, on the very next clock pulse (i.e. the 13th clock pulse) the first flip-flop of unit 406 will transition to produce a high logic level reset trigger on line 82 which will in turn cause NOR gate 210 (FIG. 3) to produce a reset signal on line 52 to cause all of the 12 flip-flops in the pulse number generator 58 to transition back to their low logic state thus removing all outputs Q1 through Q12.

At the same time, the complement of the signal on line 82 is output on line 84 to increment the sending sequence counter 60. Furthermore, the output $Q_0$ of the first flip-flop in circuit 406 is connected to enable the second flip-flop of circuit 406 such that upon the occurrence of the next clock pulse on line 70, the second flip-flop will be triggered to produce another recycle signal on line 81 to initiate yet another cycle of data generation and transmission.

Figure 7:
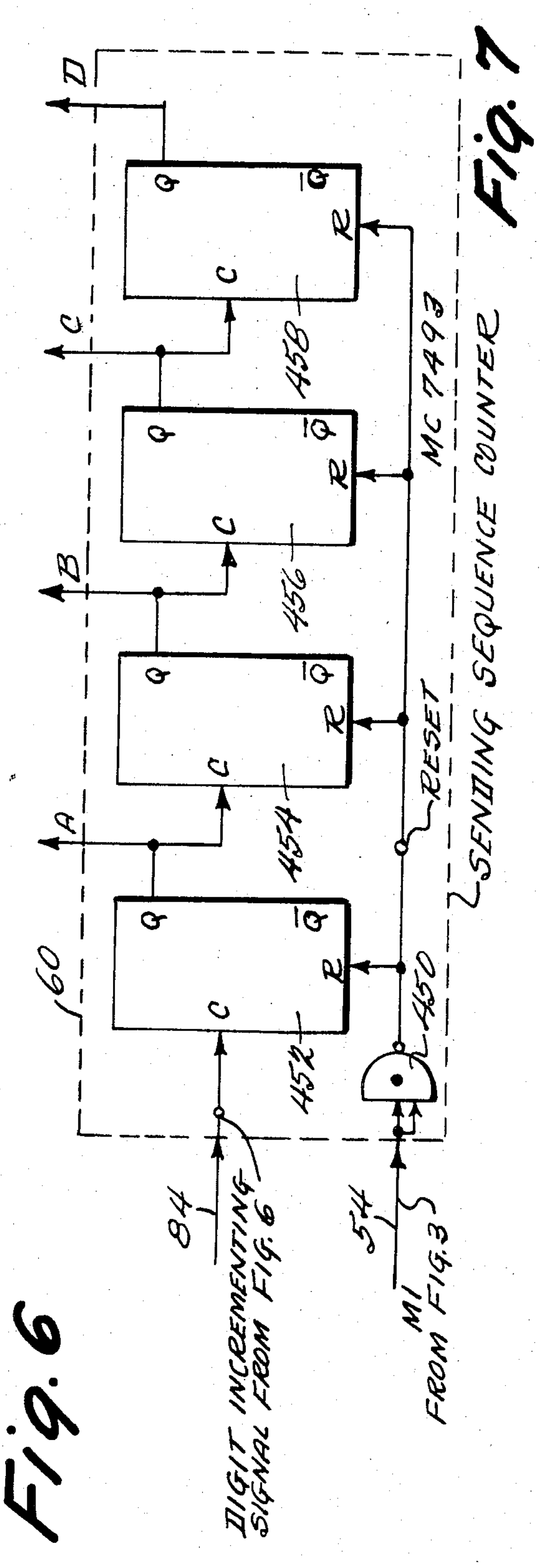
FIG. 7 is a detailed circuit diagram of an exemplary sending sequence counter which is also shown generally in block form in FIG. 1.

The sending sequence counter 60 is shown in more detail at FIG. 7. The logic signal M1 on line 54 is utilized through AND gate 450 to reset all of flip-flops 452, 454, 456 and 458 as shown in FIG. 7. Furthermore, the flip-flops 452-458 are interconnected in the usual four-stage binary counter chain as will be appreciated by those in the art. The digit incrementing signal along line 84 from FIG. 6 is input to clock the first flip-flop 452. The outputs on lines A, B, C and D thus represent the counter contents as will be apparent to those in the art. That is, the counter contents of 0000 would correspond to the case when all of the lines A, B, C and D have a low logic level signal thereon. The counter contents of 0001 would correspond to a low logic level signal on lines A, B, and C and high logic level signal on D. Similarly, down through the final counter stage corresponding to a counter contents of 1111 whereat all of the lines A, B, C, and D have high logic level signals thereon.

Figure 8:
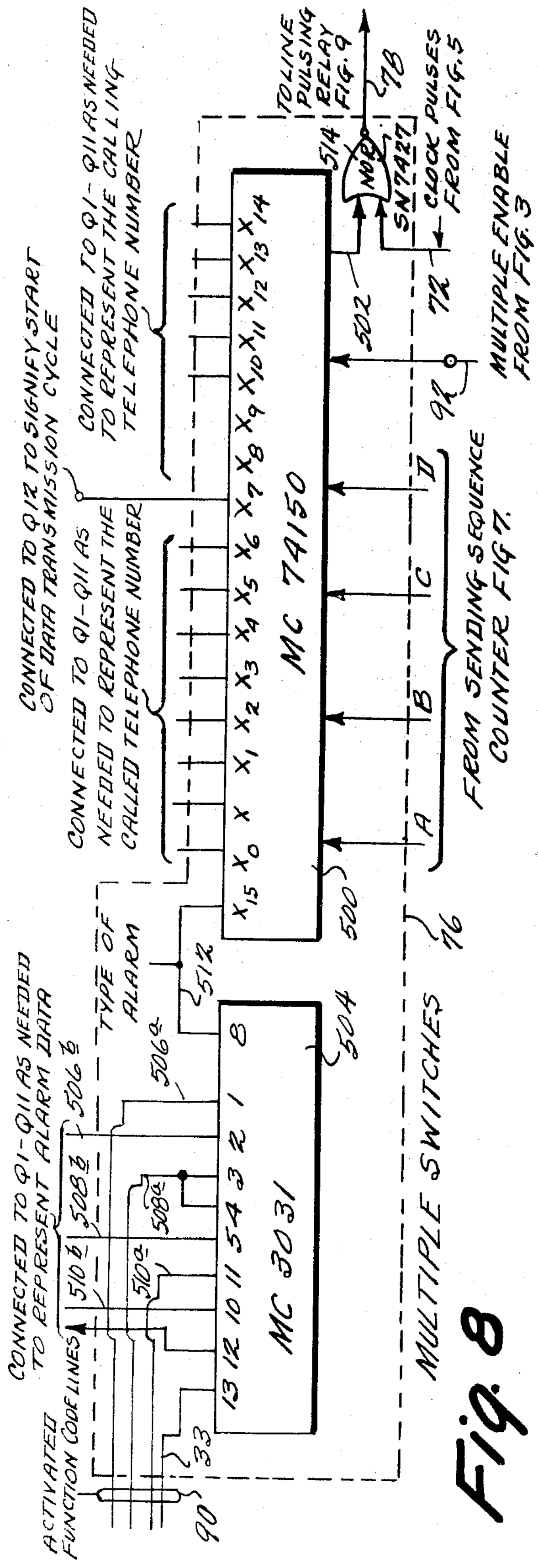
FIG. 8 is a detailed circuit diagram of exemplary multiplex switches which are also shown generally in block form at FIG. 1.

The multiplex switches 76 are shown in more detail at FIG. 8. The main element in the multiplex switches 76 comprises a conventional integrated circuit multiplex switch 500 which may be conditioned to connect one of the inputs $X_0$ through $X_{15}$ with a common output terminal 502 whenever an enabling signal is present on line 92. Which particular input gets connected to the common output 502 depends entirely upon the way in which circuit 500 is conditioned by the inputs on lines A, B, C and D from the sending sequence counter 60. That is, when the sending sequence counter has a contents of 0000 the multiplex switch 500 is conditioned to connect terminal $X_0$ to the output 502. When the counter contents is 0001 input terminal $X_1$ is connected to the output 502. When the counter contents is 0010 (corresponding to decimal 2) the input terminal $X_2$ is connected to the output terminal 502. Similarly, as will be apparent to those in the art, the other particular inputs $X_3$ through $X_{15}$ are respectively associated with a particular one of the remaining states of the sending sequence counter such that finally terminal $X_{15}$ is connected to the output 502 when the counter state is 1111.

An explicit connection of gating circuits for achievig the same or equivalent function as is achieved in integrated circuit 500 may be obtained from my earlier copending patent application Ser. No. 76,436.

The first seven inputs $X_0$ through $X_6$ are connected to the various outputs Q1 through Q11 of the pulse number generator 58 as appropriate to represent a particular predetermined telephone number for the receiving site. For instance, if the predetermined telephone number is 539-6524, $X_0$ would be connected to terminal Q5, $X_1$ would be connected to Q3, etc.

Terminals $X_0$ through $X_6$ are successively connected, in sequence, to the output 502 during the first time period of overall operation for the monitoring and alarm device. At the end of the first time period, the enable signal on line 92 is temporarily removed for a time period determined by monostable multivibrator 244 (FIG. 3) thus giving the telephone exchange time to connect the desired remote receiving site (corresponding to the telephone number just dialed by simulation).

At the end of this time delay period, the enabling signal reappears on line 92 and the sending sequence counter is again incremented to result in transmission of whatever data value is connected to terminal $X_7$. In the preferred embodiment, the receiver to be employed at the receiving site requires a special data identifying digit to identify the beginning or start of a data transmission period and accordingly this data value is connected to terminal $X_7$. In the preferred embodiment, this special data value corresponds to 12 successive pulses in a single train and accordingly, terminal Q12 is connected to terminal $X_7$.

The next seven successive terminals are connected as needed to terminals Q1 through Q11 to represent the telephone number of the calling station. That is, the telephone number of the subscriber for telephone line 34. Of course, other data codes could be utilized to represent the location of the alarm monitoring device or the subscriber thereof. As previously discussed, the pulse number generator will be driven at the higher clock rate at this time during the second transmission period.

After transmitting these further seven digit values connected to terminals up through $X_{14}$, the sending sequence counter will again be incremented to the state 1111 whereupon the input terminal $X_{15}$ will be connected with the output terminal 502. At this time, a special code is to be transmitted depending upon which one of the alarm devices has actually been actuated. To achieve this result, an expander switch 504 is connected with its output to the input $X_{15}$ of the circuit multiplex switch 500. Circuit 504 again comprises a conventional integrated switching circuit of gates; however, those in the art will readily appreciate that a simple series of dual input AND gates with their outputs all connected together in common would also serve this function.

The activated alarm code lines in cable 90 are connected to corresponding inputs of gating circuit 504. For instance the line coming from the burglar alarm is connected to line **506*a* while the line coming from the fire alarm is connected to line 508*a* and the line coming from the cardiac alarm is connected to input 510*a*. The integrated circuit 504 is effectively a series of AND gates such that whenever a signal is present on line 506*a*, a gate is enabled to pass the signal appearing on line 506*b*. Similarly, whenever a signal is present on line 508*a* another gate is enabled to pass a signal appearing on line 508*b* onto a common output 512. Furthermore, whenever a signal appears on line 510*a*, another gate is enabled to pass whatever also appears on input 510*b* to common output 512.**

As should now be apparent to those in the art, the controlled inputs **506*b*, 508*b* and 510*b* are connected as required to the outputs Q1 through Q11 of the pulse number generator 58 to represent the predetermined code corresponding to the particular alarm associated therewith. Accordingly, depending upon which one of the alarms has been activated (and thus upon which one of the controlling inputs has been energized), a particular one of the controlled inputs 506***b*, 508*b* or 510*b*, will be effectively gated to a common output 512 which is in turn connected to the input $X_{15}$ of the multiplex switch 500. Accordingly, the final digit value of the 16 digits being transmitted will correspond to the particular activated alarm as should now be apparent.

The common output on line 502 from the multiplex switch 500 corresponds then to one of the outputs Q1 through Q12 depending upon the state of the sending sequence counter and the particular interconnections which are made for a particular program between the terminals Q1 through Q12 and the input terminals of the multiplex switch 500. Accordingly, if the data value 6, for example, is to be transmitted, at some particular point in time when that digit is to be transmitted, the multiplex switch 500 will be conditioned to pass the output from terminal Q6 through the multiplex switch 500 and to line 502. This output from terminal Q6 will be 6 clock pulses long and accordingly, when it is used as an enabling input to NOR gate 514, this gate is permitted to pass 6 clock pulses from line 72 onto the common output line 78 for driving the line pulsing relays circuits 48.

The line pulsing relay circuits 48 are shown in more detail in FIG. 9. A logic level signal M2 on line 43 is input to turn on transistor T2 and thus open the circuit between output terminals 36-1 and 36-2 on one side of the telephone line 34 during the initial line seizure operations as previously discussed. After the initial line seizure operations, M2 goes low and has no further affect on the line pulsing relay circuits 48.

The multiplex output on line 78 from the multiplex switch 76 is also input to control transistor T2 and thus successively energize the relay 520 and open contacts 522 and 524 thus opening the circuit in one side of the telephone line 34 as should be apparent from FIG. 9. This opening occurs, of course, for each pulse of the pulse trains being emitted along line 78. Accordingly, in the previous example of the transmission for the digit value number 6, 6 clock pulses would be gated through NOR gate 514 (FIG. 8) and on to line 78 to energize transistor and deenergize transistor $T_2$ six successive times for this single pulse train thus causing the relay 520 to open and close (i.e. pulse) the telephone line 34 six times to represent the digit value 6 as should now be apparent.

Accordingly, now that the entire exemplary embodiment has been explained in detail, those in the art will appreciate that once any given alarm is activated, the entire device is stimulated to begin a complete overall cycle of operation. This overall cycle of operation begins with the initial line closure then opening and then closing again in a sequence designed to insure seizure of the connected telephone line. Thereafter, a low frequency first period of operation begins whereat the telephone line is pulsed or otherwise stimulated successively corresponding to the successive digits of a predetermined telephone number where a suitable telephone receiving apparatus is situated. Typically, this could be a central station for a service operation where the central operator continually watches the receiver and takes appropriate action when an indication of alarm is registered thereon.

An appropriate time delay is incorporated into the system after such a simulated dialing of the remote receiving site to give a central telephone exchange equipment time to actually select and connect the receiving site with the transmitting site. Thereafter, a series of (14 in the exemplary embodiment) multiple data transmissions begins wherein further identifying data is transmitted to the receiving site to identify both the general location of the transmitting site as well as the particular kind of alarm that has been triggered so that appropriate action may be taken at the receiving end. This second period of operation occurs at a higher frequency typically in the audio band from 100 to 4,000 Hz. During this second period, each transmission cycle results in the transmission of a series of predetermined digits which may correspond to individual pulse trains in the preferred embodiment. After this identifying data has been multiply transmitted the required number of times, the unit automatically restores itself to its previous quiescent monitoring state.

The command circuit 98 (and an accompanying added flip-flop FF5) are shown in FIG. 12 together with necessary modifications to the connections of monostable multivibrators 204 and 244 and flip-flop FF4 previously shown in FIG. 3. Except as noted here in FIG. 12, all connections are exactly as shown in FIG. 3.

The command circuit 98 essentially comprises a multistage counter which, depending on the frequency of its input, is capable of counting to a predetermined contents during a predetermined time interval. In essence, it is a high pars digital frequency filter which provides an output whenever its digital input meets or exceeds a predetermined frequency.

As will be explained below, when this command circuit is to be used, the remote receiver is adapted to transmit 300 Hz. digital signals for an initial time period. The command circuit counter at the transmitting site is continually being reset by the low frequency clock pulses (e.g., 10 Hz.) such that between such resets it can count up to 15 of the 300 Hz. answer back pulses from terminal 36-2 and thus provide an answer back output on line 532 as shown in FIG. 12. Obviously, the number of counter stages, reset source and the counter contents detector (AND gate as shown in FIG. 12) could be adjusted appropriately to detect other than 300 Hz. answer back codes.

From the previous description, it will be recalled that monostable 244 has a period of approximately 17 seconds. As shown in FIG. 12, FF4 is now enabled by M4. Thus, FF4 is only enabled during the period of monostable 244 while the transmitter is waiting for the remote receiver to be accessed.

If, in fact, the proper answer back code is detected to generate a signal on line 532, then FF4 is clocked and subsequent operation is as previously described.

On the other hand, if during the duration of M4 the proper answer back signal is *not* detected, then this indicates that the correct number has not been dialed or that the remote receiver line is busy or that one of the transmission lines is busy, or that some other problem has occurred to prevent successful access of the remote receiver.

Thus, if FF4 is still not clocked at the end of the duration of M4, FF5 is still not clocked ($\overline{Q}$ still high) and when $\overline{M4}$ also goes high, AND gate 534 provides an output to trigger monostable 204 and start another dialing sequence as previously described.

This process will continue until finally a proper answer back signal is received. Then, FF4 will transition thus clocking FF5 and removing one high input from gate 534 thus preventing another redialing and permitting the further data transmissions to the remote receiver.

An exemplary remote receiver circuit is shown in FIG. 13 for generating the 300 Hz. answer back code.

As soon as ringing current is delivered by in-coming telephone lines 550,552, relay coil 554 is energized. Preferably, relay 554 is a DC latching relay although an AC latching relay may be used with an appropriate AC energizing circuit being provided as will be appreciated.

Contacts 554*a* and 554*b* are then actuated from their normal positions (shown in FIG. 13) to the opposite position. Thus the incoming lines 550, 552 are bridged by resistor 556 while monostable multivibrator 558 is simultaneously set (Q goes high). The one-shot 558 remains on for about 200 milliseconds.

If desired, an alarm device 560 can also be triggered by contacts 554*b*.

During its operation, one-shot 558 provides an output $\overline{Q}$ to NOR gate 562 thus enabling it to pass 300 Hz. pulses from oscillator 564. These gated 300 Hz. pulses are input to 566 which drive relay coil 568 thereby causing relay contacts 568*a* to pulse the incoming telephone lines 550, 552 at a 300 Hz. rate for the duration of $\overline{Q}$ (about 200 ms). Simultaneously, the Q output of monostable 558 drives transistor 570 which, in turn, energizes relay coil 572 to cause contacts 572*a* to short out the data receiver 574 thus preventing any spurious response to the 300 Hz. answer back signal.

The alarm 560 can be stopped and the receiver placed back in a normal standby condition by actuating switch 576 to energize relay coil 578 which is adapted to normally position relay contacts 554*a* and 554*b*.

A somewhat generalized self-explanatory flow diagram is shown in FIG. 14 for summarizing the operation of the preferred exemplary transmitter embodiment incorporating the special answer back or command detector, etc., as previously described.

A typical touch tone telephone receiver circuit is shown in FIG. 15. As will be apparent to those in the art, every time one of the 12 touch tone buttons **(0,1,2, . . . 9, #,*) is depressed, two of the electrical switches 601–607 are selectively closed to cause generation and transmission of two frequencies over the telephone lines 34. In effect, switches 601–604 control the resonant frequency of a first tank circuit by switching in more or less inductance while switches 605–607** similarly control the resonant frequency of a second tank circuit. Conventionally, the first tank circuit always resonates at a frequency lower than the second tank circuit thereby permitting selective generation of any one "high" frequency and any one "low" frequency for each touch tone button.

For the systems now generally in use, each depression of a touch tone button (corresponding to one digit of a called telephone number) will generate a predetermined combination of one high frequency and one low frequency.

Of course, for actual transmission over lines 34, switches 608*a*, 608*b* and 608*c* are also actuated with each touch tone button as will be appreciated by those in the art. Switches 609–610 are, of course, closed when the receiver is taken "off the hook" as should also be apparent.

An exemplary touch tone adapter for the previously discussed system is shown in FIG. 16. Here switches (relay contacts) 701–707, 708*a*, 708*b* and 708*c* can be directly substituted for switches 601–607, 608*a*, 608*b* and 608*c* respectively in FIG. 15. Alternatively, these switches in FIG. 16 could be simply connected in parallel with the corresponding switches in FIG. 15 to permit either manual or automatic touch tone operation as should soon become apparent.

As shown in FIG. 16, the outputs A, B, C, D from the sending sequence counter 60 of FIG. 6 are connected to the four inputs of a binary decoder 710 which has normally high level outputs $\overline{Q}_0$, $\overline{Q}_1$ . . . $\overline{Q}_9$. These outputs are sequentially caused to individually go to a low level as the binary A, B, C, D input signals go through the first 10 successive binary states. For instance, when the input is 0000 (0 being low level and 1 being high level) the $\overline{Q}_0$ output would be 0 while $\overline{Q}_1 - \overline{Q}_9$ would be 1. Thereafter when the input is 0001, $\overline{Q}_1$ would go to a 0 while $\overline{Q}_0$ and $\overline{Q}_2 - \overline{Q}_9$ would be at 1, etc. In other words, $\overline{Q}_0 - \overline{Q}_9$ outputs are successively caused to transistion from a high to a low level as the input A, B, C, D goes through the normal binary sequence as explained above. While a conventional IC decoder is referenced in FIG. 16, those in the art will recognize that this and other logic elements shown in FIG. 16 could easily be replaced with other equivalent discrete and/or IC circuitry.

The gates G, 1L–4L and 1H–3H are each four input AND gates. As shown in FIG. 16, the output of each one is inverted and used to condition a corresponding transistor driver to operate a corresponding relay and associated contacts 701–708 as should be apparent.

As connected in FIG. 16 to terminals T1–T9, T0, T* and T #, the standard touch tone frequencies will be generated for a particular digit value when all corresponding terminals T1–T # are high *except* for the particular one corresponding to the desired digit value. Therefore, the adapter can be programmed to generate any desired train of touch tone signals or pulses by properly interconnecting the outputs $\overline{Q}_0 - \overline{Q}_9$ of decoder 170 with terminals T1–T #.

For instance, suppose the telephone number 822-5745 is to be touch tone accessed. The program interconnections would then be made as shown in FIG. 16. When $\overline{Q}_0$ goes low, gates 3L and 2H (connected to terminal T8) will be disabled causing their inverted outputs to go high thus activating their respectively corresponding transistor drivers and relay coils to finally result in closing contacts 703 and 706. Of course anytime any one of gates 1L–4L is disabled, gate G will also be disabled causing relay contacts 708*a*, 708*b* and 708*c* to be actuated as should now be apparent. Thus, the first touch tone digit signal sent out corresponds to the digit 8. As can be verified from the above and FIG. 16, the next digit would correspond to 2, etc.

Of course, electronic switches can be substituted for the relay switches, etc., if desired. Furthermore, other types of conventional logic circuits can obviously be designed to bring about the same end results. Also, if desired appropriate disabling circuits can be incorporated to disable the touch tone adapter of FIG. 16 except during the time period when the remote telephone is to be accessed, i.e., it could be disabled during the multiple transmission of data values after the remote receiver has already been successfully accessed.

In the regular exemplary dialing system first discussed above, the low frequency oscillator operated at about 10 Hz. to simulate the approximately 10 Hz. pulse rate of standard dialers. This meant that each digit value could take up to approximately 1 second to completely transmit. That is, the sending sequence counter 60 would be incremented at an approximately 1 Hz rate thus taking 7–10 seconds to dial a complete telephone number.

However, in touch tone systems it is feasible to transmit digit values at a much higher rate. For instance, each two frequency tone is conventionally translated back to a decimal code at the telephone exchange. With solid state switching and buffer storage registers telephone exchanges can accept up to 10 digit values per second and then translate these back to the actual switching equipment at approximately two digits per second. Even older switching exchanges could accept higher digit input rates provided conventional buffer storage registers are provided for temporarily storing the received digit values as will be apparent to those in the art.

Thus, assuming a properly equipped central telephone exchange, each digit of a called telephone number could be transmitted in one-tenth of a second in the touch tone method. This could easily be achieved in the above system by increasing the low frequency oscillator to about 100 Hz. whereupon the sequence counter 60 would be incremented approximately every one-tenth of a second. (The above is not exactly true since the pulse number generator 58 acts as a 12:1 frequency divider rather than a 10:1 divider.) In this case, the entire called telephone number could be touch tone encoded and transmitted in approximately one-tenth the time required in the regular dialing type of a system.

Another possibility for increasing the effective dialing speed in a touch tone system *without* the adapter of FIG. 16 is to merely increase the low frequency oscillator frequency *and* to bypass the tone-to-pulse converter or translator in the telephone exchange. This, however, obviously requires some modifications at the central telephone exchange.

The location and alarm identification data are transmitted as previously discussed after the desired remote receiver has been accessed.

Although only a few specific exemplary embodiments have been discussed in detail, those in the art will readily appreciate that many modifications may be made in the exemplary embodiments without in any way departing from the novel and advantageous features of the invention. Accordingly, all such modifications are intended to be included within the scope of this invention.

What is claimed is:

1. A monitoring device for direct electrical connection to a telephone line, which device automatically generates signals for accessing a predetermined remote telephone receiver through direct connection with the telephone line in response to the triggering of an input sensor and which thereafter automatically generates further identifying and data digital pulse signals for transmission to the remote receiver, said monitoring device comprising:

input terminals adapted for respective connection to corresponding input sensor circuits, output terminals adapted for direct electrical connection to said telephone line, activation means connected to said input terminals for activating said device and for reliably seizing control of the telephone line even if then being used by first electrically closing said telephone line, then electrically opening said telephone line for a predetermined delay period sufficient to insure that the telephone line is restored to a non-busy condition and then subsequently electrically closing said telephone line thus reliably seizing control of same all in response to the triggering of any of said input sensor circuits, first signal generating means connected to respond to the output of said activation means by automatically generating a predetermined sequence of signals at said output terminals for accessing said predetermined remote telephone receiver during a first time interval, and second signal generating means connected, to automatically generate and multiply transmit a predetermined sequence of identifying digital pulse signals and data digital pulse signals at said output terminals during a second subsequent time interval representing the identity of said device and of the triggered input sensor circuit.

2. A monitoring device as in claim 1 wherein said activation means comprises:

gating circuitry with multiple inputs connected to corresponding ones of said input terminals for providing an output signal whenever any one of its inputs is stimulated, a monostable multivibrator connected for triggering by the output signal of said gating circuitry, and a power source gate connected for supplying power to other circuits in said monitoring device in response to the output signal of said gating circuitry.

3. A monitoring device for direct electrical connection to a telephone line which device automatically generates signals for accessing a predetermined remote telephone receiver through direct connection with the telephone line in response to the triggering of an input sensor and which thereafter automatically generates further identifying and data digital pulse signals for transmission to the remote receiver, said monitoring device comprising:

input terminals adapted for respective connection to corresponding input sensor circuits, output terminals adapted for direct electrical connection to said telephone line, activation means connected to said input terminals for activating said device and for reliably seizing control of the telephone line even if then being used in response to the triggering of any of said input sensor circuits, first signal generating means connected to respond to the output of said activation means by automatically generating a predetermined sequence of signals at said output terminals for accessing said predetermined remote telephone receiver during a first time interval, and second signal generating means connected, to automatically generate and multiply transmit a predetermined sequence of identifying digital pulse signals and data digital pulse signals at said output terminals during a second subsequent time interval representing the identity of said device and of the triggered input sensor circuit, wherein said activation means comprises:

gating circuitry with multiple inputs connected to corresponding ones of said input terminals for providing an output signal whenever any one of its inputs is stimulated, a monostable multivibrator connected for triggering by the output signal of said gating circuitry, and a power source gate connected for supplying power to other circuits in said monitoring device in response to the output signal of said gating circuitry, and wherein said first signal generating means comprises:

a clock for producing clock pulses, a sending sequence counter connected to increment its contents and provide interstage outputs representative thereof in response to a predetermined number of at least one clock pulse, and means connected to said counter for producing said predetermined sequence of signals for accessing said predetermined remote telephone receiver in response to a successive sequence of said interstage outputs.

4. A monitoring device as in claim 3 wherein said means connected to said counter comprises gating circuitry for effecting selective actuation of appropriate touch tone signal generating switches.

5. A monitoring device as in claim 3 wherein:

said clock includes a pulse number generator means for cyclically producing plural outputs which are individually representative of corresponding possible individual digit values, and further comprising:

output gating means connected to said counter interstage outputs and having plural ordered inputs which are individually gated to a common output in correspondence with the instantaneous state of said counter, and predetermined ones of said plural outputs being connected to predetermined ones of said plural ordered inputs whereby a predetermined sequence of signals is caused to appear at said common output.

6. A monitoring device for connection to a telephone line which device automatically generates electrical signals for accessing a predetermined remote telephone receiver through the telephone line in response to the triggering of a sensor and which thereafter automatically generates further identifying digital data pulse signals for transmission to the remote receiver, said monitoring device comprising:

input terminals adapted for respective connection to corresponding sensor circuits, output terminals adapted for connection to said telephone line, unit activation means connected to said input terminals for activating said device in response to the triggering of any of said sensor circuits, pulse signal generating means connected to said output terminals for electrically stimulating said telephone line with pulses in response to said activation and to driving clock pulses applied thereto, low frequency driving means connected to produce first clock pulses to drive said signal generating means during an initial period after activation for generating pulse signals having a corresponding low repetition rate representing the telephone number of the remote receiver, and higher frequency driving means connected to produce second clock pulses to drive said signal generating means during at least one further period, subsequent to said initial period, for generating pulse signals having a corresponding high repetition rate representing identification data for the triggered sensor.

7. A monitoring device as in claim 6, further comprising:

line seizure means for automatically and positively insuring the seizure of said telephone line by said device in response to its activation and prior to said initial period.

8. A monitoring device as in claim 6 further comprising:

multiple data transmission control means connected to said signal generating means for causing said identification data to be generated and transmitted a predetermined number of times during a corresponding number of said further periods.

9. A monitoring device as in claim 6 wherein said unit activation means comprises:

gate means having plural inputs connected to corresponding input terminals and a single output line for producing a start signal on said output line in response to an input signal from any of said inputs.

10. A monitoring device as in claim 9 wherein said unit activation means further comprises:

a first monostable multivibrator circuit connected to trigger in response to said start signal and thereby produce an activation pulse of a first predetermined time duration.

11. A monitoring device as in claim 10 further comprising:

switch means connected across said telephone lines for closing a circuit thereacross during said first predetermined time period to thereby simulate a momentary telephone answering period.

12. A monitoring device as in claim 11 further comprising:

a second monostable multivibrator circuit connected to trigger in response to the termination of said start signal and thereby produce a wait pulse of a second predetermined time duration, and means connected between said switch means and said second monostable circuit to cause said switch means to open said circuit across the telephone lines during said second predetermined time duration thereby simulating a waiting period corresponding to an idle telephone line condition to thus permit any connected central office telephone equipment time to change accordingly.

13. A monitoring device for direct electrical connection to a telephone line, which device automatically generates signals for accessing a predetermined remote telephone receiver through direct connection with the telephone line in response to the triggering of an input sensor and which thereafter automatically generates further identifying and data digital pulse signals for transmission to the remote receiver, said monitoring device comprising:

input terminals adapted for respective connection to corresponding input sensor circuits, output terminals adapted for direct electrical connection to said telephone line, activation means connected to said input terminals for activating said device and for reliably seizing control of the telephone line even if then being used in response to the triggering of any of said input sensor circuits, first signal generating means connected to respond to the output of said activation means by automatically generating a predetermined sequence of signals at said output terminals for accessing said predetermined remote telephone receiver during a first time interval, and second signal generating means connected, to automatically generate and multiply transmit a predetermined sequence of identifying digital pulse signals and data digital pulse signals at said output terminals during a second subsequent time interval representing the identity of said device and of the triggered input sensor circuit, wherein said activation means comprises:

gating circuitry with multiple inputs connected to corresponding ones of said input terminals for providing an output signal whenever any one of its inputs is stimulated, a monostable multivibrator connected for triggering by the output signal of said gating circuitry, a power source gate connected for supplying power to other circuits in said monitoring device in response to the output signal of said gating circuitry, and means connected to said monostable multivibrator for initially closing said telephone line circuit during an initial time period and for thereafter opening said telephone line circuit for a subsequent time period and then reclosing the telephone line circuit.

14. A monitoring device as in claim 3 further comprising:

means connected to said first signal generating means for causing said predetermined sequence of signals output therefrom to be cyclically repeated unless an acceptable answer back signal is received from the predetermined remote telephone receiver signifying successful access thereto.

15. A monitoring device for direct electrical connection to a telephone line, which device automatically generates signals for accessing a predetermined remote telephone receiver through direct connection with the telephone line in response to the triggering of an input sensor and which thereafter automatically generates further identifying and data digital pulse signals for transmission to the remote receiver, said monitoring device comprising:

input terminals adapted for respective connection to corresponding input sensor circuits, output terminals adapted for direct electrical connection to said telephone line, activation means connected to said input terminals for activating said device and for reliably seizing control of the telephone line even if then being used in response to the triggering of any of said input sensor circuits, first signal generating means connected to respond to the output of said activation means by automatically generating a predetermined sequence of signals at said output terminals for accessing said predetermined remote telephone receiver during a first time interval, and second signal generating means connected, to automatically generate and multiply transmit a predetermined sequence of identifying digital pulse signals and data digital pulse signals at said output terminals during a second subsequent time interval representing the identity of said device and of the triggered input sensor circuit, wherein said second signal generating means comprises:

pulse generating means for cyclically producing plural data outputs which are individually representative of corresponding possible individual identifying and data digit signal values, a multistate digit transmission sequencing means connected to said pulse generating means, the state of which is incremented for each of said cyclic operations of the pulse generating means, output gating means having plural ordered inputs which are individually gated to a common output in correspondence with the instantaneous state of said multistate digit transmission sequencing means, predetermined ones of said plural data outputs being connected to predetermined ones of said plural ordered inputs whereby a predetermined sequence of output signals is caused to appear at said common output, and line stimulation means connected to said output terminals and controlled by said sequence of output signals to stimulate the telephone line in accordance with programmed interconnections between the pulse generating means and the output gating means.

16. A monitoring device as in claim 6 including said sensors which comprise metering devices.

* * * * *